(12) United States Patent
Takeda et al.

(10) Patent No.: US 12,418,370 B2
(45) Date of Patent: Sep. 16, 2025

(54) TERMINAL, RADIO COMMUNICATION METHOD, BASE STATION, AND SYSTEM FOR CONTROLLING HARQ-ACK FEEDBACK

(71) Applicant: NTT DOCOMO, INC., Tokyo (JP)

(72) Inventors: Kazuki Takeda, Tokyo (JP); Satoshi Nagata, Tokyo (JP); Shaozhen Guo, Beijing (CN); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 466 days.

(21) Appl. No.: 17/421,907

(22) PCT Filed: Jan. 10, 2019

(86) PCT No.: PCT/JP2019/000605
§ 371 (c)(1),
(2) Date: Jul. 9, 2021

(87) PCT Pub. No.: WO2020/144832
PCT Pub. Date: Jul. 16, 2020

(65) Prior Publication Data
US 2022/0103310 A1   Mar. 31, 2022

(51) Int. Cl.
*H04L 1/1867*  (2023.01)
*H04L 1/1607*  (2023.01)
*H04L 1/1812*  (2023.01)
*H04L 1/1829*  (2023.01)

(52) U.S. Cl.
CPC .......... *H04L 1/1887* (2013.01); *H04L 1/1812* (2013.01)

(58) Field of Classification Search
CPC ... H04L 1/1812; H04L 1/1887; H04L 1/1664; H04L 1/1829; H04L 1/1187; H04L 1/1896
See application file for complete search history.

(56) References Cited

U.S. PATENT DOCUMENTS

| 2016/0295584 | A1  | 10/2016 | Chen et al. |
| 2018/0049203 | A1* | 2/2018  | Xue ................. H04L 5/0035 |
| 2018/0070341 | A1* | 3/2018  | Islam ............... H04L 5/0064 |
| 2018/0249374 | A1  | 8/2018  | Park et al. |
| 2018/0279327 | A1  | 9/2018  | Ying et al. |
| 2019/0052416 | A1* | 2/2019  | Babaei .............. H04L 1/188 |

(Continued)

FOREIGN PATENT DOCUMENTS

CN   107438969 A   12/2017

OTHER PUBLICATIONS

Office Action issued in counterpart Japanese Patent Application No. 2020-565124 mailed on Feb. 21, 2023 (13 pages).

(Continued)

*Primary Examiner* — Jenee Holland
(74) *Attorney, Agent, or Firm* — Osha Bergman Watanabe & Burton LLP

(57) ABSTRACT

A user terminal includes: a control section that determines a set of one or more candidate occasions for reception of a downlink shared channel available in a time unit, based on a HARQ-ACK timing value using the time unit shorter than a slot and a format of the time unit; and a transmitting section that transmits a codebook being determined based on the set of the one or more candidate occasions.

5 Claims, 26 Drawing Sheets

(56) References Cited

U.S. PATENT DOCUMENTS

| | | | | |
|---|---|---|---|---|
| 2019/0103943 | A1* | 4/2019 | Wang | H04L 1/1854 |
| 2019/0327755 | A1* | 10/2019 | Xiong | H04L 5/0046 |
| 2019/0342055 | A1* | 11/2019 | Zhang | H04L 1/1614 |
| 2019/0349941 | A1* | 11/2019 | Yang | H04L 1/1896 |
| 2020/0106554 | A1* | 4/2020 | Chendamarai Kannan | H04L 1/1812 |
| 2020/0196335 | A1* | 6/2020 | Lei | H04L 1/1614 |
| 2020/0213046 | A1* | 7/2020 | Wang | H04L 1/1861 |
| 2020/0287691 | A1* | 9/2020 | Baldemair | H04L 5/0055 |
| 2020/0336255 | A1* | 10/2020 | Wong | H04W 72/0453 |
| 2021/0112545 | A1* | 4/2021 | Lin | H04W 72/12 |
| 2021/0314105 | A1* | 10/2021 | Gao | H04L 1/1812 |
| 2021/0329610 | A1* | 10/2021 | Shen | H04L 5/0091 |
| 2022/0103310 | A1* | 3/2022 | Takeda | H04L 1/1896 |
| 2022/0116156 | A1* | 4/2022 | Takeda | H04L 1/1861 |
| 2023/0164589 | A1* | 5/2023 | Wu | H04W 72/23 370/329 |

OTHER PUBLICATIONS

International Search Report issued in PCT/JP2019/000605 on Feb. 2, 2019 (5 pages).
Written Opinion of the International Searching Authority issued in PCT/JP2019/000605 on Feb. 2, 2019 (6 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TS 38.213 V15.3.0; "3rd Generation Partnership Project; Technical Specification Group Radio Access Network; NR; Physical layer procedures for control (Release 15)"; Sep. 2018 (76 pages).
Oppo, "UCI enhancement for URLLC", 3GGP TSG RAN WG1 Meeting #95, R1-1812816, Spokane, USA, Nov. 12-18, 2018, pp. 1-6 (7 pages).
Office Action issued in counterpart Chinese Patent Application No. 201980093924.1 mailed on May 12, 2023 (20 pages).
Ericsson, "PDSCH demodulation requirements for sTTI", 3GPP TSG-RAN WG4 Meeting #86, R4-1802370, Athens, Greece, Feb. 26-Mar. 2, 2018 (3 pages).
Office Action issued in the counterpart Russian Patent Application No. 2022116952/07(035784), mailed on Aug. 15, 2022 (8 pages).
Extended European Search Report issued in counterpart European Patent Application No. 19908814.7, mailed on Jun. 7, 2022 (6 pages).
LG Electronics; "URLLC aspects on DL/UL scheduling and HARQ management"; 3GPP TSG RAN WG1 Meeting 93, R1-1806626; Busan, Korea; May 21-25, 2018 (6 pages).
Office Action issued in Chinese Application No. 201980093924.1; Dated Oct. 11, 2023 (19 pages).
Decision of Rejection issued in Chinese Application No. 201980093924.1, mailed May 31, 2024 (27 pages).
Office Action issued in Chinese Patent Application No. 201980093924.1 mailed on Jan. 25, 2024 (17 pages).

* cited by examiner

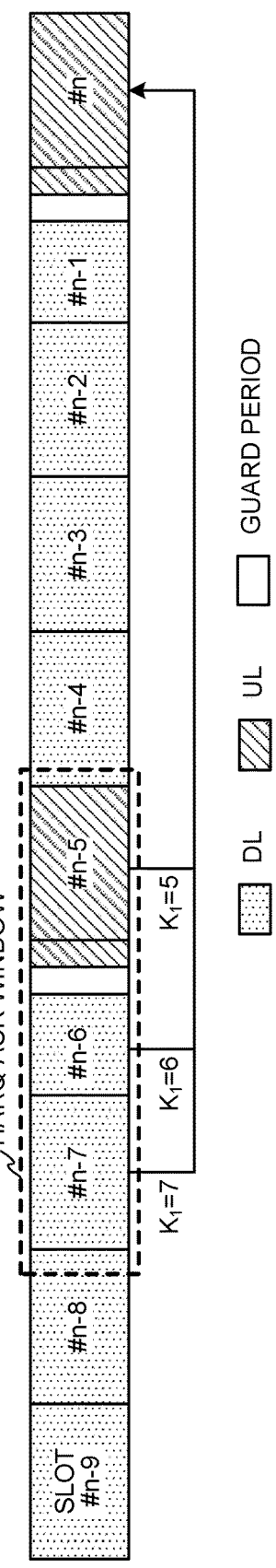
FIG. 1A
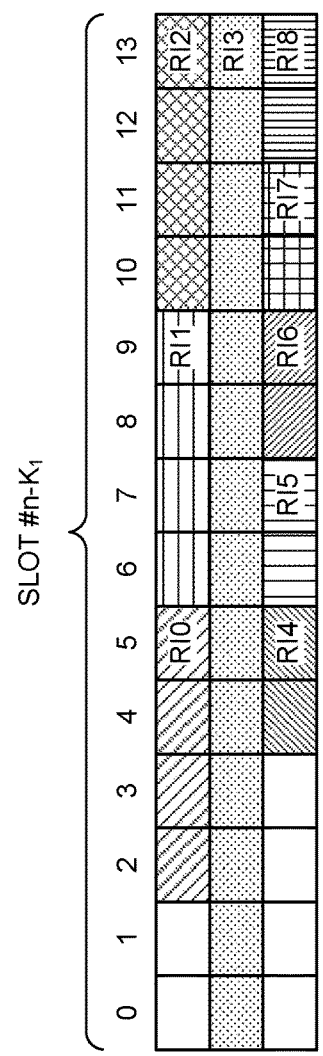
FIG. 1C
FIG. 1B

SUB-TABLE 1

| RI | K0 | S | L | MAPPING TYPE |
|---|---|---|---|---|
| 0 | 0 | 2 | 4 | B |
| 1 | 0 | 4 | 2 | B |

SUB-TABLE 2

| RI | K0 | S | L | MAPPING TYPE |
|---|---|---|---|---|
| 0 | 0 | 6 | 4 | B |
| 1 | 0 | 10 | 4 | B |
| 2 | 0 | 0 | 14 | A |
| 3 | 0 | 6 | 2 | B |
| 4 | 0 | 8 | 2 | B |
| 5 | 0 | 10 | 2 | B |
| 6 | 0 | 12 | 2 | B |

CANDIDATE PDSCH RECEPTION OCCASIONS $M_{A,C}$ = {0, 1, 2, 3}

FIG. 13A

PDSCH TIME DOMAIN RA TABLE COMMON TO SERVICES

| RI | $K_0$ | S | L | MAPPING TYPE | |
|---|---|---|---|---|---|
| 0 | 0 | 2 | 4 | B | ⎫ |
| 1 | 0 | 6 | 4 | B | |
| 2 | 0 | 10 | 4 | B | |
| 3 | 0 | 0 | 14 | A | FOR URLLC |
| 4 | 0 | 4 | 2 | B | |
| 5 | 0 | 6 | 2 | B | |
| 6 | 0 | 8 | 2 | B | |
| 7 | 0 | 10 | 2 | B | |
| 8 | 0 | 12 | 2 | B | ⎭ |
| 9 | 0 | 0 | 7 | B | ⎫ |
| 10 | 0 | 6 | 7 | B | FOR eMBB |
| 11 | 0 | 0 | 14 | A | ⎭ |

FIG. 13B

PDSCH TIME DOMAIN RA TABLE FOR URLLC

| RI | $K_0$ | S | L | MAPPING TYPE |
|---|---|---|---|---|
| 0 | 0 | 0 | 7 | B |
| 1 | 0 | 6 | 7 | B |
| 2 | 0 | 0 | 14 | A |

PDSCH TIME DOMAIN RA TABLE FOR eMBB

| RI | $K_0$ | S | L | MAPPING TYPE |
|---|---|---|---|---|
| 0 | 0 | 2 | 4 | B |
| 1 | 0 | 6 | 4 | B |
| 2 | 0 | 10 | 4 | B |
| 3 | 0 | 0 | 14 | A |
| 4 | 0 | 4 | 2 | B |
| 5 | 0 | 6 | 2 | B |
| 6 | 0 | 8 | 2 | B |
| 7 | 0 | 10 | 2 | B |
| 8 | 0 | 12 | 2 | B |

TERMINAL, RADIO COMMUNICATION METHOD, BASE STATION, AND SYSTEM FOR CONTROLLING HARQ-ACK FEEDBACK

TECHNICAL FIELD

The present disclosure relates to a user terminal and a radio communication method in next-generation mobile communication systems.

BACKGROUND ART

In Universal Mobile Telecommunications System (UMTS) networks, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

In existing LTE systems (for example, 3GPP Rel. 8 to Rel. 14), a user terminal (User Equipment (UE)) transmits uplink control information (UCI) by using at least one of a UL data channel (for example, a Physical Uplink Shared Channel (PUSCH)) and a UL control channel (for example, a Physical Uplink Control Channel (PUCCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (hereinafter referred to as NR), it is assumed that a value (also referred to as a HARQ-ACK timing value or the like) for indicating transmission timing of transmission confirmation information (also referred to as a Hybrid Automatic Repeat reQuest-ACKnowledgement (HARQ-ACK), an ACKnowledgement/Non-ACKnowledgement (ACK/NACK), an A/N, or the like) for a DL signal (for example, a PDSCH) is specified for the user terminal (User Equipment (UE)) by using at least one of a higher layer parameter and downlink control information (DCI).

For NR, the following is under study: the UE determines a codebook including certain HARQ-ACK bit(s) (also referred to as a HARQ-ACK codebook, a HARQ codebook, or the like), based on HARQ-ACK timing value(s), and feeds back the codebook to the base station. Accordingly, it is desirable that the UE be capable of appropriately controlling at least one of determination and feedback of the codebook.

In the light of the above, the present disclosure has one object to provide a user terminal and a radio communication method capable of appropriately controlling at least one of determination and feedback of a HARQ-ACK codebook.

Solution to Problem

A user terminal according to one aspect of the present disclosure includes: a control section that determines a set of one or more candidate occasions for reception of a downlink shared channel available in a time unit, based on a Hybrid Automatic Repeat reQuest-ACKnowledge (HARQ-ACK) timing value using the time unit shorter than a slot and a format of the time unit; and a transmitting section that transmits a codebook being determined based on the set of the one or more candidate occasions.

Advantageous Effects of Invention

According to one aspect of the present disclosure, at least one of determination and feedback of the HARQ-ACK codebook can be appropriately controlled.

BRIEF DESCRIPTION OF DRAWINGS

FIGS. 1A to 1C are each a diagram to show an example of a HARQ-ACK timing value at a slot level;

FIGS. 13A and 13B are each a diagram to show an example of PDSCH time domain RA for each service according to the second method of the second aspect;

DESCRIPTION OF EMBODIMENTS

Figure 2:
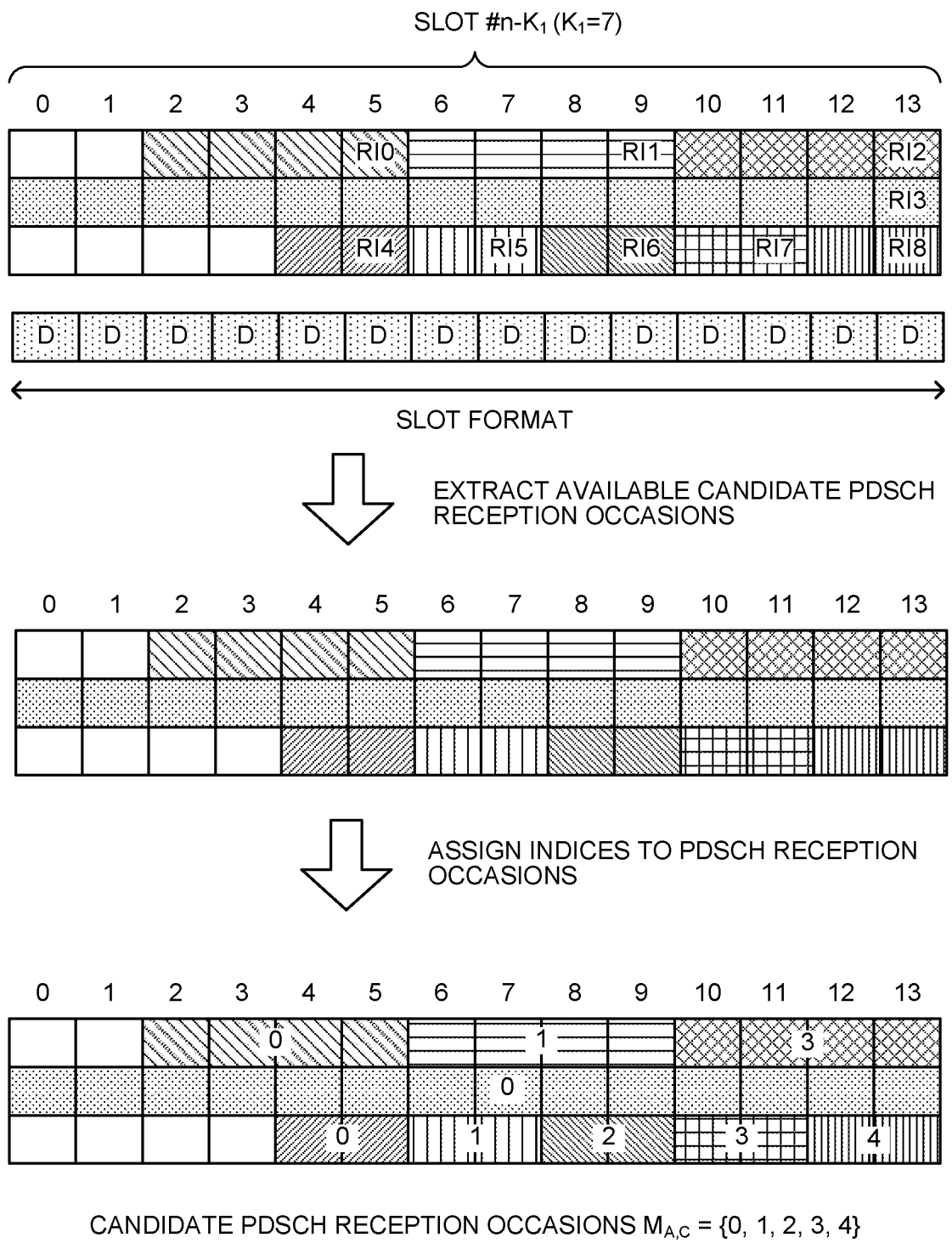
FIG. 2 is a diagram to show the first example of semi-static codebook determination operation at the slot level.

For NR, the following mechanism has been under study: a user terminal (UE (User Equipment)) gives feedback (also referred to as report, transmission, or the like) of transmission confirmation information (also referred to as a Hybrid Automatic Repeat reQuest-ACKnowledge (HARQ-ACK), an ACKnowledge/Non-ACK (ACK/NACK), HARQ-ACK information, an A/N, or the like) for a downlink shared channel (also referred to as a Physical Downlink Shared Channel (PDSCH) or the like).

For example, in NR, a value of a certain field in DCI (for example, DCI format 1_0 or 1_1) used for scheduling of the PDSCH indicates feedback timing of the HARQ-ACK for the PDSCH. When the UE uses slot #n+k to transmit a HARQ-ACK for the PDSCH received in slot #n, the value of the certain field may be mapped to the value of k. The certain field is referred to as, for example, a PDSCH-HARQ feedback timing indication (PDSCH-to-HARQ_feedback timing indicator) field or the like.

In NR, a PUCCH resource to be used for feedback of the HARQ-ACK for the PDSCH is determined based on the value of the certain field in the DCI (for example, DCI format 1_0 or 1_1) used for scheduling of the PDSCH. The certain field may be referred to as, for example, a PUCCH resource indicator (PRI) field, an ACK/NACK resource indicator (ARI) field, or the like. The value of the certain field may be referred to as a PRI, an ARI, or the like.

The PUCCH resource mapped to each value of the certain field may be configured for the UE in advance by using a higher layer parameter (for example, ResourceList in PUCCH-ResourceSet). The PUCCH resource may be configured for the UE for each set (PUCCH resource set) that includes one or more PUCCH resources.

For NR, the following is under study: the UE is enabled to transmit one or a plurality of uplink control channels (Physical Uplink Control Channels (PUCCHs)) for the HARQ-ACK in a single slot.

In NR, one or more HARQ-ACKs are mapped to a HARQ-ACK codebook, and the HARQ-ACK codebook may be transmitted on the PUCCH resource that is indicated by certain DCI (for example, the most recent (last) DCI).

Here, the HARQ-ACK codebook may include bit(s) for the HARQ-ACK in a unit of at least one of a time domain (for example, a slot), a frequency domain (for example, a component carrier (CC)), a spatial region (for example, a layer), a transport block (TB), and a group of code blocks (code block group (CBG)) constituting the TB. Note that the CC is also referred to as a cell, a serving cell, a carrier, or the like. The bit is also referred to as a HARQ-ACK bit, HARQ-ACK information, a HARQ-ACK information bit, or the like.

The HARQ-ACK codebook is also referred to as a PDSCH-HARQ-ACK codebook (pdsch-HARQ-ACK-Codebook), a codebook, a HARQ codebook, a HARQ-ACK size, or the like.

The number of bits (size) included in the HARQ-ACK codebook and the like may be either semi-statically or dynamically determined. The HARQ-ACK codebook whose size is semi-statically determined is also referred to as a semi-static HARQ-ACK codebook, a type-1 HARQ-ACK codebook, a semi-static codebook, or the like. The HARQ-ACK codebook whose size is dynamically determined is also referred to as a dynamic HARQ-ACK codebook, a type-2 HARQ-ACK codebook, a dynamic codebook, or the like.

Which of the semi-static HARQ-ACK codebook or the dynamic HARQ-ACK codebook is used may be configured for the UE by using the higher layer parameter (for example, pdsch-HARQ-ACK-Codebook).

In a case of the semi-static HARQ-ACK codebook, the UE may give feedback of the HARQ-ACK bits corresponding to a certain range, regardless of whether or not there is scheduling of the PDSCH in the certain range. The certain range is also referred to as a HARQ-ACK window, a HARQ-ACK bundling window, a HARQ-ACK feedback window, a bundling window, a feedback window, or the like.

<Semi-Static Codebook Determination Operation at Slot Level>

The semi-static HARQ-ACK codebook at the slot level may be determined based on at least one parameter of the following a) to d):

a) Value (HARQ-ACK timing value) $K_1$ indicating timing of the HARQ-ACK b) Table (PDSCH time domain resource allocation (RA) table) used for determination of a time domain resource allocated to the PDSCH c) When different subcarrier spacings are configured for a downlink and an uplink, the ($\mu_{DL}$-$\mu_{UL}$) laud power of ratio 2 between a configuration $\mu_{DL}$ of a subcarrier spacing of a downlink (or a downlink BWP) and a configuration $\mu_{UL}$ of a subcarrier spacing of an uplink (or an uplink BWP)

d) Cell-specific TDD UL/DL configuration (for example, TDD-UL-DL-ConfigurationCommon), and a slot-specific configuration (for example, TDD-UL-DL-ConfigDedicated) that overwrites the cell-specific TDD UL/DL configuration Specifically, the UE may determine a set of candidate PDSCH reception occasions $M_{A, c}$ in which the HARQ-ACK bits can be transmitted in the PUCCH transmitted in slot n in a serving cell c (or an active downlink BWP and uplink BWP of the serving cell c), based on the at least one parameter. For example, the UE may determine the set of candidate PDSCH reception occasions $M_{A, c}$ according to the following steps 1) and 2).
Step 1)

The UE determines the HARQ-ACK window, based on the HARQ-ACK timing value $K_1$ at the slot level. For example, in FIG. 1A, the HARQ-ACK window for the HARQ-ACK bits transmitted in slot #n is determined as slot #n-$K_1$ ($K_1$=2, 3, 4). It can also be said that the HARQ-ACK window is cardinality of a set C ($K_1$) of HARQ-ACK timing values $K_1$. For example, in FIG. 1A, C ($K_1$)={7, 6, 5}.

Note that C ($K_1$) including one or more HARQ-ACK timing values $K_1$ may be determined based on at least one of a certain field value in the DCI and the higher layer parameter (for example, dl-DataToUL-ACK).
Step 2)

mThe UE may determine the candidate PDSCH reception occasions $M_{A, c}$ in each slot for each HARQ-ACK timing value $K_1$ in C ($K_1$). The UE may determine the semi-static HARQ-ACK codebook to be transmitted in slot #n by repeating the following steps 2-1) and 2-2) for each HARQ-ACK timing value $K_1$ in C ($K_1$).
Step 2-1)

The UE may determine available candidate PDSCH reception occasions $M_{A, c}$ in slot #n-$K_1$, based on at least one of the PDSCH time domain RA table and a format of slot #n-$K_1$ corresponding to the HARQ-ACK timing value $K_1$. The candidate PDSCH reception occasion may be a period to (also referred to as an occasion, a candidate occasion, or the like) be one or more candidates for reception of the PDSCH.

Specifically, the UE may determine the candidate PDSCH reception occasions $M_{A, c}$ of slot #n-$K_1$, based on the PDSCH time domain RA table, and subsequently may deem at least a part of the candidate PDSCH reception occasions $M_{A, c}$ unavailable and eliminate the part, based on the format of slot #n-$K_1$ (or may deem at least a part of the candidate PDSCH reception occasions $M_{A, c}$ available and extract the part, based on the format of slot #n-$K_1$).

Note that the format of slot #n-$K_1$ may be determined based on at least one of the cell-specific TDD UL/DL configuration (for example, TDD-UL-DL-Configuration-Common described above), the slot-specific TDD UL/DL configuration (for example, TDD-UL-DL-ConfigDedicated), and the DCI.
Step 2-2)

The UE assigns indices to the candidate PDSCH reception occasions $M_{A, c}$ determined in step 2-1). The UE may assign the same index (value) to a plurality of candidate PDSCH reception occasions $M_{A, c}$ whose at least some of the symbols overlap, and may generate the HARQ-ACK bits for each index (value) of the candidate PDSCH reception occasions.

The following illustrates an example of determination of the static HARQ-ACK codebook when the set C ($K_1$) of HARQ-ACK timing values $K_1$ includes 7, 6, and 5 (see FIG. 1A) with reference to FIGS. 1B, 1C, and 2 to 4.

FIG. 1B shows an example of the PDSCH time domain RA table. As shown in FIG. 1B, in the PDSCH time domain RA table, for example, a row index (RI) may be associated with at least one of an offset $K_0$, an index S of a start symbol to which the PDSCH is allocated, the number L of symbols (allocation length) allocated to the PDSCH, and a mapping type of the PDSCH. Each row of the PDSCH time domain RA table may indicate the PDSCH time domain RA (that is, the candidate PDSCH reception occasion) for the PDSCH.

FIG. 1C shows an example of the candidate PDSCH reception occasions $M_{A, c}$ determined based on the PDSCH time domain RA table of FIG. 1B. For example, in the PDSCH time domain RA table of FIG. 1B, if RI=0, $K_0$=0, S=2, and L=4. Thus, the candidate PDSCH reception occasions determined based on RI=0 include four symbols from symbol #2 of slot #n-$K_1$ (that is, symbols #2 to #5). In a similar manner, FIG. 1C shows the candidate PDSCH reception occasions determined based on RI=1 to 8.

<<Case in which $K_1$=7>>

FIG. 2 shows a case in which slot #n-$K_1$ is a format whose constituent symbols are all downlink symbols (D). In slot #n-$K_1$ whose constituent symbols are all downlink symbols (for example, slot #n-7 of FIG. 1A), the UE can use all of the candidate PDSCH reception occasions $M_{A, c}$ determined based on each of RI=0 to 8.

Accordingly, as shown in FIG. 2, all of the candidate PDSCH reception occasions $M_{A, c}$ determined based on each of RI=0 to 8 are extracted, and indices (identifiers or IDs) are assigned to the extracted candidate PDSCH reception occasions $M_{A, c}$. Here, the same index may be assigned to a plurality of candidate PDSCH reception occasions $M_{A, c}$ whose at least some of the symbols overlap (collide).

For example, in FIG. 2, some of the symbols of three candidate PDSCH reception occasions $M_{A, c}$ determined based on RI=0, 3, and 4 overlap, and thus the same index "0" is assigned to these candidate PDSCH reception occasions $M_{A, c}$. In a similar manner, some of the symbols of two candidate PDSCH reception occasions $M_{A, c}$ determined based on RI=2 and 7 overlap, and thus the same index "3" is assigned to these candidate PDSCH reception occasions $M_{A, c}$.

The candidate PDSCH reception occasions $M_{A, c}$ in slot #n-$K_1$ include candidate PDSCH reception occasions identified with different indices (values) "0" to "4". The UE may generate a certain number (for example, 1 bit) of HARQ-ACK bits for the candidate PDSCH reception occasions of each index.

For example, in FIG. 2, one UE can use five candidate PDSCH reception occasions $M_{A, c}$ in slot #n-$K_1$, and may thus generate the semi-static HARQ-ACK codebook including the HARQ-ACK bits of 5 bits.

<Case in which $K_1$=6>>

Figure 3:
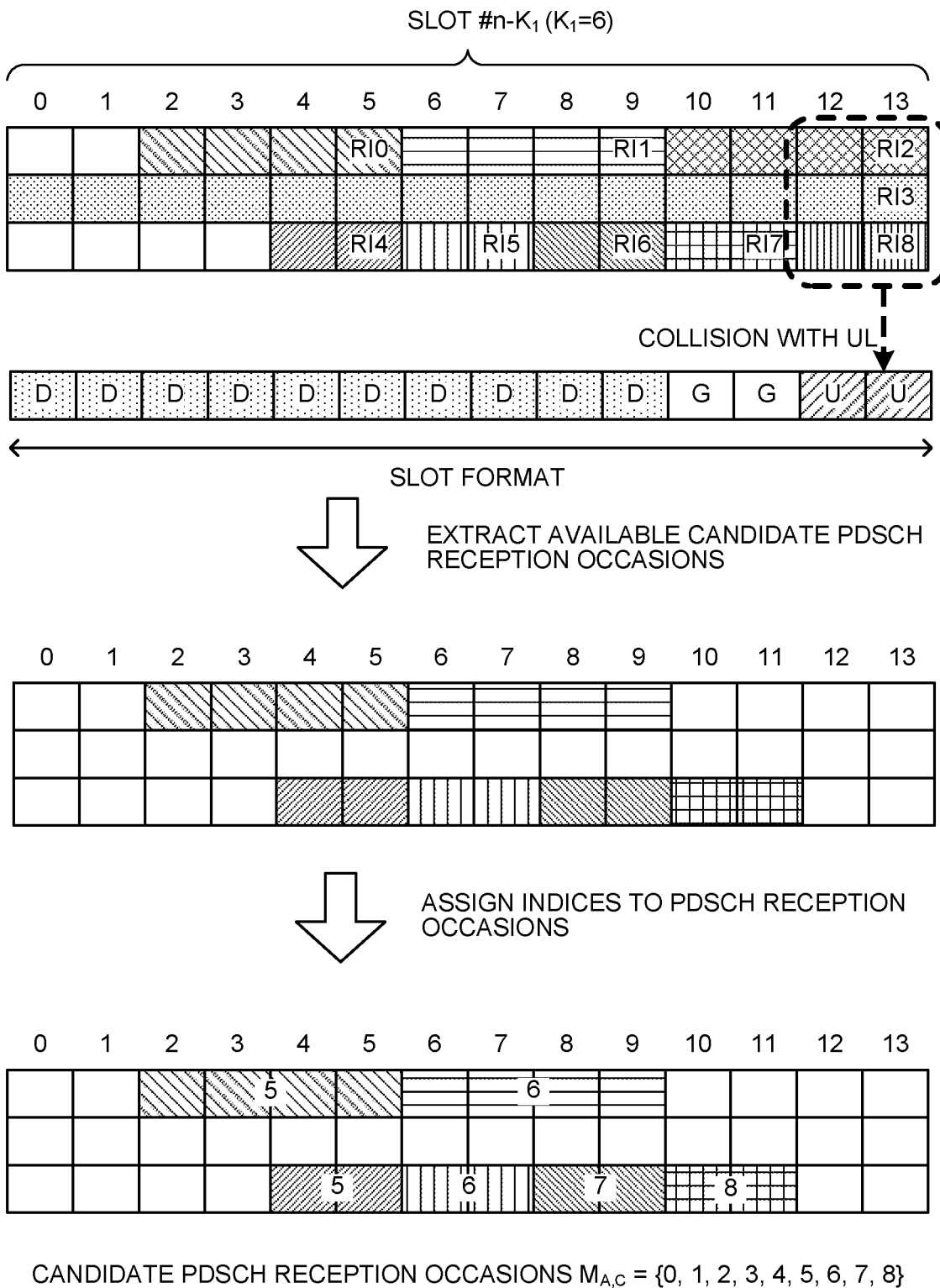
FIG. 3 is a diagram to show the second example of the semi-static codebook determination operation at the slot level.

FIG. 3 shows a case in which slot #n-$K_1$ is a format including downlink symbols (D), uplink symbols (U), and guard periods (G). For example, in FIG. 3, symbols #0 to #9 of slot #n-$K_1$ (for example, slot #n-5 of FIG. 1A) are the downlink symbols, symbols #12 and #13 are the uplink symbols, and symbols #10 and #11 are the guard periods.

In the case shown in FIG. 3, the candidate PDSCH reception occasions including uplink symbols #12 and #13 for example, the candidate PDSCH reception occasions determined based on RI=2, 3, and 8) cannot be used in slot #n-$K_1$. This is because the UE cannot receive the PDSCH in uplink symbols #12 and #13.

Accordingly, as shown in FIG. 3, all of the candidate PDSCH reception occasions $M_{A, c}$ determined based on each of RI=0, 1, and 4 to 7 except the candidate PDSCH reception occasions determined based on RI=2, 3, and 8 are extracted, and indices (identifiers or IDs) are assigned to the extracted candidate PDSCH reception occasions $M_{A,c}$.

Note that the indices may be assigned with serial numbers in the set C ($K_1$) of HARQ-ACK timing values $K_1$. For example, as described with reference to FIG. 2, in the case in which $K_1$=7, indices "0" to "4" may be assigned to the candidate PDSCH reception occasions $M_{A,c}$ in slot #n-$K_1$. For this reason, in the case in which $K_1$=6 shown in FIG. 3, succeeding indices "5" to "8" may be assigned to the candidate PDSCH reception occasions $M_{A,c}$ in slot #n-$K_1$.

As described above, the same index may be assigned to a plurality of candidate PDSCH reception occasions $M_{A,c}$ whose at least some of the symbols overlap (collide). For example, in FIG. 3, some of the symbols of two candidate PDSCH reception occasions $M_{A,c}$ determined based on RI=0 and 4 overlap, and thus the same index "5" is assigned to these candidate PDSCH reception occasions $M_{A,c}$. In a similar manner, the same index "6" is assigned to two candidate PDSCH reception occasions $M_{A,c}$ determined based on RI=1 and 5.

In this manner, in the UE, the semi-static HARQ-ACK codebook corresponding to the candidate PDSCH reception occasions $M_{A,c}$ in slot #n-$K_1$ ($K_1$=7, 6) may include a certain number (for example, 9 bits) of HARQ-ACK bits corresponding to the candidate PDSCH reception occasions identified with different indices (values) "0" to "8".

<<Case in which $K_1$=5>>

Figure 4:
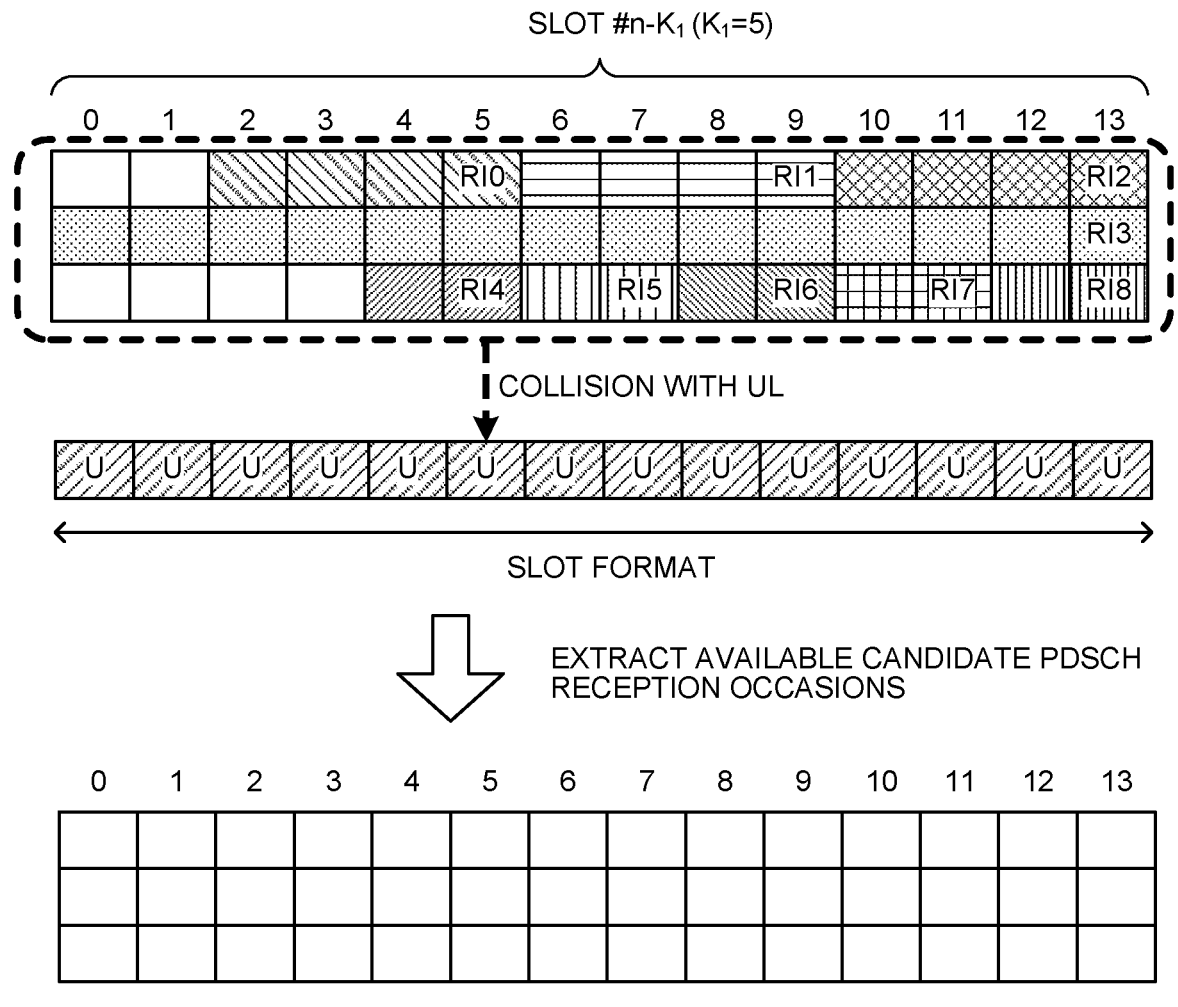
FIG. 4 is a diagram to show the third example of the semi-static codebook determination operation at the slot level.

FIG. 4 shows a case in which slot #n-$K_1$ is a format whose constituent symbols are all uplink symbols (U). For example, in FIG. 4, all of symbols #0 to #13 in slot #n-$K_1$ (for example, slot #n-5 of FIG. 1A) are the uplink symbols.

In the case shown in FIG. 4, all of the candidate PDSCH reception occasions determined based on RI=0 to 8 cannot be used in slot #n-$K_1$. Accordingly, as shown in FIG. 4, available candidate PDSCH reception occasions need not be extracted in slot #n-$K_1$. In this case, the HARQ-ACK bits corresponding to slot #n-$K_1$ ($K_1$=5) shown in FIG. 4 need not be included in the semi-static HARQ-ACK codebook corresponding to C ($K_1$)=7, 6, 5.

As described above, the following is under study: the semi-static HARQ-ACK codebook is determined based on the HARQ-ACK timing value $K_1$ at the slot level. On the other hand, in NR, the following has also been under study: in order to satisfy requirements of a service of ultra reliable and low latency (for example, a service (URLLC service) related to Ultra Reliable and Low Latency Communications (URLLC)), the HARQ-ACK timing value $K_1$ using a time unit shorter (finer) than the slot is supported (introduced).

However, when the HARQ-ACK timing value K1 using the time unit shorter than the slot is introduced, how to determine (configure (construct) or generate) the semi-static HARQ-ACK codebook poses a problem. In the light of this, the inventors of the present invention studied a method of appropriately determining the semi-static HARQ-ACK codebook, based on the HARQ-ACK timing value K1 using the time unit shorter than the slot (first aspect), and thereby arrived at the present invention.

In NR, it is also assumed that the same UE supports a plurality of services with different requirements (for example, the URLLC service and a service of high speed and large capacity (for example, a service (eMBB service) related to enhanced Mobile Broad Band (eMBB))).

However, when the same UE supports a plurality of services, how to control at least one of determination (configuration or generation) and feedback of the semi-static HARQ-ACK codebook also poses a problem. In the light of this, the inventors of the present invention studied a method in which the UE supporting a plurality of services appropriately controls at least one of determination and feedback of the semi-static HARQ-ACK codebook (second aspect), and thereby arrived at the present invention.

Embodiments according to the present disclosure will be described in detail with reference to the drawings as follows.

Note that the following description assumes a case in which a single transport block (TB) (also referred to as a codeword (Code word (CW)) or the like) is transmitted on a single PDSCH. However, the present embodiment can also be applied to a case in which a plurality of TBs are transmitted on a single PDSCH as appropriate.

The following description assumes a case in which a single HARQ-ACK bit is generated for a single TB. However, the present embodiment can also be applied to a case in which a single HARQ-ACK bit is generated for a single code block group (CBG) as appropriate. One TB is divided (segmented) into one or more code blocks (CBs). One TB may include one or more CBGs, and one CBG may include one or more CBs.

(First Aspect)

The semi-static codebook determination based on the HARQ-ACK timing value at the time unit level shorter than the slot will be described.

The first aspect assumes a case in which, for example, the UE supports a specific service (for example, the URLLC service) and does not support other services (for example, the eMBB service). However, the present invention is not limited to this case. The first aspect can also be applied to a case in which the UE supports both of the services but does not active the service (for example, the eMBB service) other than the specific service (for example, the URLLC service), a case in which a plurality of different services are accommodated in a common radio interface, and so on.

<Precondition>

In the first aspect, the UE supports the HARQ-ACK timing value $K_1$ using the time unit that is shorter than the slot (that includes the number of symbols smaller than the number of symbols of the slot). The time unit may be referred to as a half-slot, a sub-slot, a mini-slot, or the like, and may include a certain number of symbols (for example, two, three, four, or seven symbols).

Figure 5A:
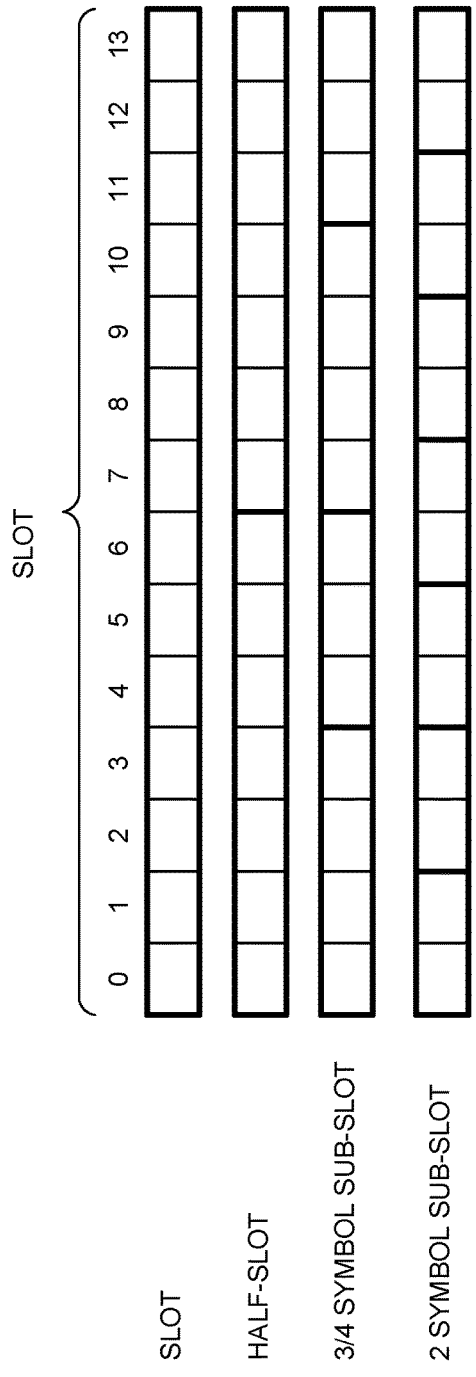
FIGS. 5A and 5B are each a diagram to show an example of the HARQ-ACK timing value at a sub-slot level according to the first aspect.

FIG. 5A shows an example of the time unit shorter than the slot. As shown in FIG. 5A, the half-slot may include 7 symbols, and two half-slots may be included in one slot. Note that the half-slot may be alternatively referred to as a sub-slot of seven symbols.

The sub-slot may include three or four symbols, and four sub-slots may be included in one slot. Alternatively, the sub-slot may include two symbols, and seven sub-slots may be included in one slot. Note that the half-slot may be referred to as a sub-slot of seven symbols.

Granularity of the HARQ-ACK timing value $K_1$ (for example, any one of the slot of FIG. 5A, the half-slot (sub-slot of seven symbols), the sub-slot of three/four symbols, and the sub-slot of two symbols) may be reported to the UE (the UE may be informed of the granularity) by using at least one of the higher layer parameter and the DCI. For example, the UE may determine the granularity of the HARQ-ACK timing value $K_1$, based on an (1) an SIB or (2) a UE-specific RRC parameter (specific RRC).

(1) Case Using SIB

For example, the granularity of the HARQ-ACK timing value $K_1$ may be configured by using a certain parameter in the SIB. In this case, the UE that does not support the granularity of the HARQ-ACK timing value $K_1$ shorter than the slot (that is, the UE that only supports the HARQ-ACK timing value $K_1$ at the slot level) cannot access a cell in which the SIB is transmitted.

In initial access, resources (Physical Random Access Channel (PRACH) resources) for a random access channel (PRACH resources) may be classified based on the granularity of the HARQ-ACK timing value $K_1$.

For example, the UE that only supports the HARQ-ACK timing value $K_1$ at the slot level and the UE that supports the HARQ-ACK timing value $K_1$ of the time unit shorter than the slot may use pools for the PRACH resources that are different from each other.

In this manner, by separating the PRACH resources, the base station can recognize whether or not the UE supports the HARQ-ACK timing value $K_1$ of the time unit shorter than the slot (for example, the half-slot or the sub-slot) before HARQ-ACK (initial HARQ-ACK) transmission for a contention resolution message (message 4) in a random access procedure.

(2) Case Using Specific RRC

Alternatively, the granularity of the HARQ-ACK timing value $K_1$ may be configured by using the UE-specific RRC parameter. In this case, the UE may transmit information (capability information) indicating that the UE supports the HARQ-ACK timing value $K_1$ shorter than the slot to the base station.

The UE may receive information indicating the granularity of the HARQ-ACK timing value $K_1$ (for example, any one of the half-slot, the sub-slot of three/four symbols, and the sub-slot of two symbols, or the like) from the base station, and the HARQ-ACK timing value $K_1$ shorter than the slot may be configured.

Figure 5B:
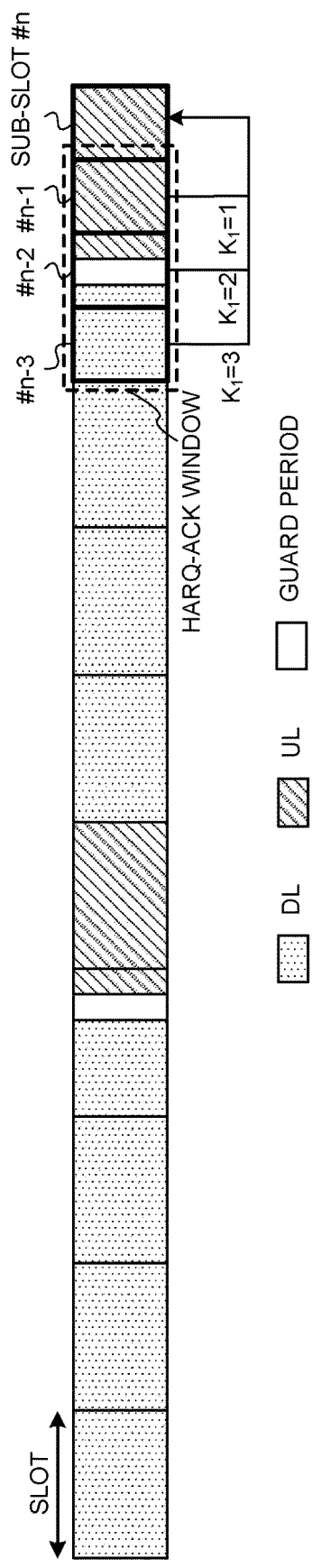

FIG. 5B shows an example of the granularity of the HARQ-ACK timing value $K_1$ shorter than the slot. In FIG. 5B, the granularity is the sub-slot of seven symbols (half-slot). However, the present invention is not limited to this. The granularity may be, as described above, the sub-slot of three/four symbols or the sub-slot of two symbols, for example.

Note that, in the following description, the "sub-slot" collectively refers to the sub-slot of seven symbols (half-slot), the sub-slot of three/four symbols, or the sub-slot of two symbols.

In FIG. 5B, the set C ($K_1$) of HARQ-ACK timing values $K_1$ at the sub-slot level includes 3, 2, and 1. As shown in FIG. 5B, when the HARQ-ACK is transmitted by using the PUCCH of sub-slot #n, the HARQ-ACK window may include sub-slot #n-$K_1$ ($K_1$=3, 2, 1).

The granularity of the HARQ-ACK timing value $K_1$ shorter than the slot as described above may enable a plurality of PUCCH transmissions for the HARQ-ACK in a single slot.

In the first aspect, the operation at the sub-slot level may be applied not only to the HARQ-ACK timing value $K_1$, but may also be applied to at least one of the following:

Granularity of a transmission timing value (slot offset with respect to an uplink grant) $K_2$ of the PUSCH Table (PUSCH time domain resource allocation (RA) table) used for determination of the time domain resource allocated to the PUSCH Configuration of the HARQ-ACK codebook Repetition of the PDSCH or the PUSCH Number of times of blind decoding of the PDCCH, or a count of the number of control channel elements (CCEs) constituting the PDCCH For example, at least one of a start symbol S in the PUSCH time domain RA table, a time length L, and an identifier SLIV of the start and the time length may be defined with reference to the time unit shorter than the slot (for example, the half-slot or the sub-slot). For example, the sub-slot length may be represented by Lmax (for example, 7), and if $(L-1) <= Floor(L_{max}/2)$ or $(L-1) >= Ceil(L_{max}/2)$, SLIV may be given according to $L_{max} (L-1)+S$; otherwise, SLIV may be given according to $L_{max} (L_{max}-L+14)+(14-1-S)$. The terminal can identify the start symbol S and the time length L of the PUSCH in the sub-slot, based on the given sub-slot length $L_{max}$ and value of SLIV.

Further, up to one HARQ-ACK codebook may be determined in the sub-slot (that is, more than one HARQ-ACK codebook may be determined for one slot).

The PDSCH or the PUSCH may be repeated with reference to the sub-slot. For example, the PDSCH or the PUSCH may be repeatedly transmitted, based on the same time resource allocation in a plurality of sub-slots.

The number of times of blind decoding of the PDCCH or the number of CCEs constituting the PDCCH may be counted with reference to the sub-slot.

<Semi-Static HARQ-ACK Codebook Determination Operation at Sub-Slot Level>

In the first aspect, determination of the semi-static HARQ-ACK codebook based on the granularity of the HARQ-ACK timing value $K_1$ at the sub-slot level will be described.

In the first aspect, when the UE determines the semi-static HARQ-ACK codebook based on the HARQ-ACK timing value $K_1$ at the sub-slot level, the UE may use at least one parameter of a) to d) described above in a manner similar to when the UE determines the semi-static HARQ-ACK codebook based on the HARQ-ACK timing value $K_1$ at the slot level. The UE may determine the set of candidate PDSCH reception occasions $M_{A, c}$, according to the following steps 1) to 3).

Step 1)

The UE determines the HARQ-ACK window, based on the HARQ-ACK timing value $K_1$ at the sub-slot level. For example, in FIG. 5B, the HARQ-ACK window for the HARQ-ACK bits transmitted in sub-slot #n is determined as sub-slots #n-3, #n-2, and #n-1. It can also be said that the HARQ-ACK window is (cardinality of) the set C ($K_1$) of HARQ-ACK timing values $K_1$. For example, in FIG. 5B, C ($K_1$)={3, 2, 1}.

Step 2)

The PDSCH time domain RA table (see FIG. 1B) may be divided into a plurality of sub-tables, based on the granularity of the HARQ-ACK timing value $K_1$. The number of sub-tables may be determined based on a period of the slot (the number of symbols in the slot) and a period corresponding to the granularity of the HARQ-ACK timing value $K_1$ (the number of symbols in the sub-slot). For example, the number of sub-tables may be a value obtained by rounding, with a floor function or a roof function, a result that is obtained by dividing the number of symbols in the slot by the number of symbols in the sub-slot.

For example, when the granularity of the HARQ-ACK timing value $K_1$ is the sub-slot of seven symbols (half-slot), the PDSCH time domain RA table may be divided into two sub-tables. When the granularity of the HARQ-ACK timing value $K_1$ is the sub-slot of three or four symbols, the PDSCH time domain RA table may be divided into four sub-tables. When the granularity of the HARQ-ACK timing value $K_1$ is the sub-slot of two symbols, the PDSCH time domain RA table may be divided into seven sub-tables.

In this manner, each sub-slot in the slot and each sub-slot in the PDSCH time domain RA table may correspond to each other on a one to one basis.

To which sub-table (to which sub-slot) each row shown in the PDSCH time domain RA table (see FIG. 1B) (or the candidate PDSCH reception occasion indicated by each row) belongs may be determined based on a certain rule. For example, the UE may determine to which sub-table each of the candidate PDSCH reception occasions belongs, based on at least one of the following:

Start symbol of the candidate PDSCH reception occasion
Last symbol of the candidate PDSCH reception occasion
When the candidate PDSCH reception occasion spans across a plurality of time units (for example, a plurality of half-slots or sub-slots) in the slot, which time unit includes a larger number of symbols in the candidate PDSCH reception period Note that, when the start and end symbols of one candidate PDSCH reception occasion spans across a plurality of sub-slots, the candidate PDSCH reception occasion may belong to the plurality of sub-slots (or a plurality of sub-tables corresponding to the respective plurality of sub-slots), or may belong to any one of the plurality of sub-slots (or the plurality of sub-tables). Specifically, the row indicating one candidate PDSCH reception occasion may be included in each of the plurality of sub-tables, or may be included only in any one of the sub-tables.

Step 3)

The UE may determine the candidate PDSCH reception occasions $M_{A,c}$ in the sub-slot for each HARQ-ACK timing value $K_1$ in C ($K_1$). The UE may determine the static HARQ-ACK codebook to be transmitted in sub-slot #n by repeating the following steps 3-1) and 3-2) for each HARQ-ACK timing value $K_1$ in C ($K_1$).

Step 3-1)

The UE may determine available candidate PDSCH reception occasions $M_{A,c}$ in sub-slot #n-$K_1$, based on at least one of the sub-tables obtained by dividing the PDSCH time domain RA table and the format of sub-slot #n-$K_1$ corresponding to the HARQ-ACK timing value $K_1$.

Specifically, the UE may deem at least a part of the PDSCH reception occasions $M_{A,c}$ belonging to the sub-table corresponding to sub-slot #n-K1 unavailable and eliminate the part, based on the format of sub-slot #n-$K_1$, (or may deem at least a part of the candidate PDSCH reception occasions $M_{A,c}$ available and extract the part, based on the format of sub-slot #n-$K_1$).

Note that the format of sub-slot #n-$K_1$ may be determined based on at least one of the cell-specific TDD UL/DL configuration (for example, TDD-UL-DL-Configuration-Common described above), the slot-specific TDD UL/DL configuration (for example, TDD-UL-DL-ConfigDedicated), and the DCI.

Step 3-2)

The UE assigns indices to the candidate PDSCH reception occasions $M_{A,c}$ determined in step 3-1). The UE may assign the same index (value) to a plurality of candidate PDSCH reception occasions $M_{A,c}$ whose at least some of the symbols overlap, and may generate the HARQ-ACK bits for each index (value) of the candidate PDSCH reception occasions.

The following illustrates an example of determination of the static HARQ-ACK codebook when the set C ($K_1$) of HARQ-ACK timing values $K_1$ at the sub-slot level includes 3, 2, and 1 (see FIG. 5B) with reference to FIGS. 6A to 6C and 7 to 9.

Figure 6A:
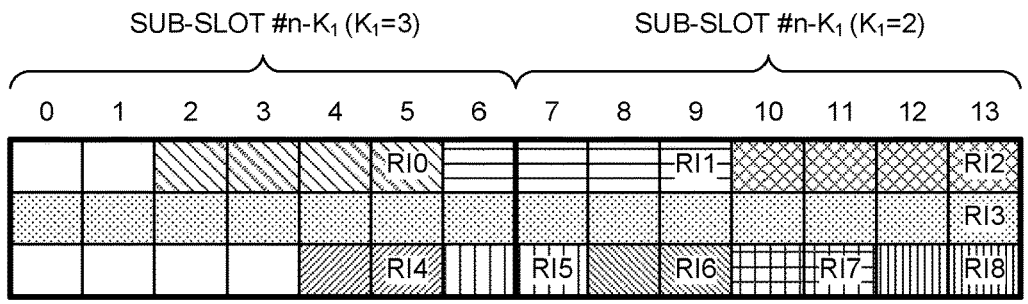
FIGS. 6A to 6C are each a diagram to show an example of a sub-table of a PDSCH time domain RA table according to the first aspect.

FIG. 6A shows an example of the candidate PDSCH reception occasions $M_{A,c}$ in a certain slot determined based on the PDSCH time domain RA table of FIG. 1B. For example, FIG. 6A shows the candidate PDSCH reception occasions determined based on the rows of RI=0 to 8 of the PDSCH time domain RA table of FIG. 1B.

In this manner, the PDSCH time domain RA table of FIG. 1B may be divided into a plurality of sub-tables according to a certain rule. For example, in FIGS. 6B and 6C, to which sub-table the candidate PDSCH reception occasion belongs is determined based on to which half-slot the last symbol of the candidate PDSCH reception occasion belongs.

Figure 6B:
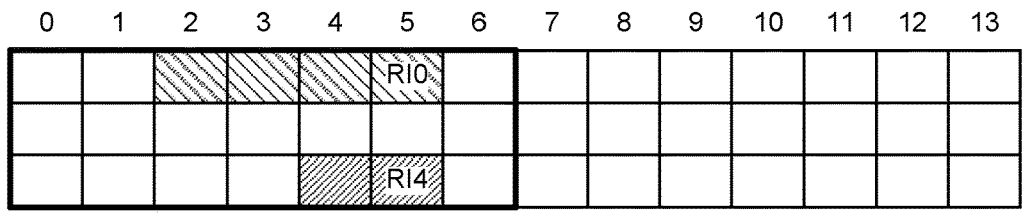

As shown in FIG. 6B, the last symbol of the candidate PDSCH reception occasions determined based on the rows of RI=0 and 4 in the PDSCH time domain RA table of FIG. 1B belongs to sub-slot #n-$K_1$ ($K_1$=3), and thus the rows of RI=0 and 4 are included in sub-table 1 that corresponds to sub-slot #n-$K_1$ ($K_1$=3). Note that the rows of RI=0 and 1 of FIG. 6B correspond to the rows of RI=0 and 4 of FIG. 1B.

Figure 6C:
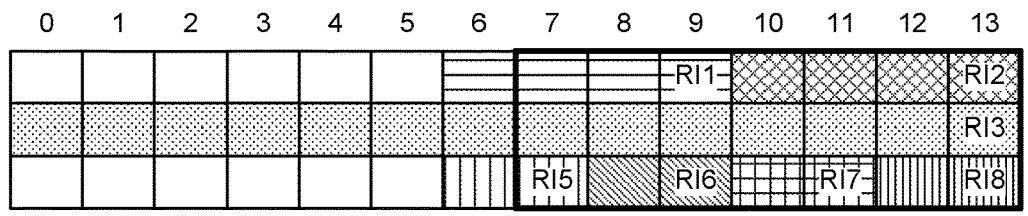

As shown in FIG. 6C, the last symbol of the candidate PDSCH reception occasions determined based on the rows of RI=1 to 3 and 5 to 8 of the PDSCH time domain RA table of FIG. 1B belongs to sub-slot #n-$K_1$ ($K_1$=2), and thus the rows of RI=1 to 3 and 5 to 8 are included in sub-table 2 that corresponds to sub-slot #n-$K_1$ ($K_1$=2). Note that the rows of RI=0 to 2 and 3 to 6 of FIG. 6C correspond to the rows of RI=1 to 3 and 5 to 8 of FIG. 1B.

As shown in FIGS. 6B and 6C, the RI may be reassigned for each sub-table, or the RI the same as that of the PDSCH time domain RA table of FIG. 1B may be used in the sub-tables as well. In the latter case, a set of rows in the PDSCH time domain RA table of FIG. 1B may be grouped into subsets for each sub-slot, without providing the sub-tables.

<<Case in which $K_1$=3>>

Figure 7:
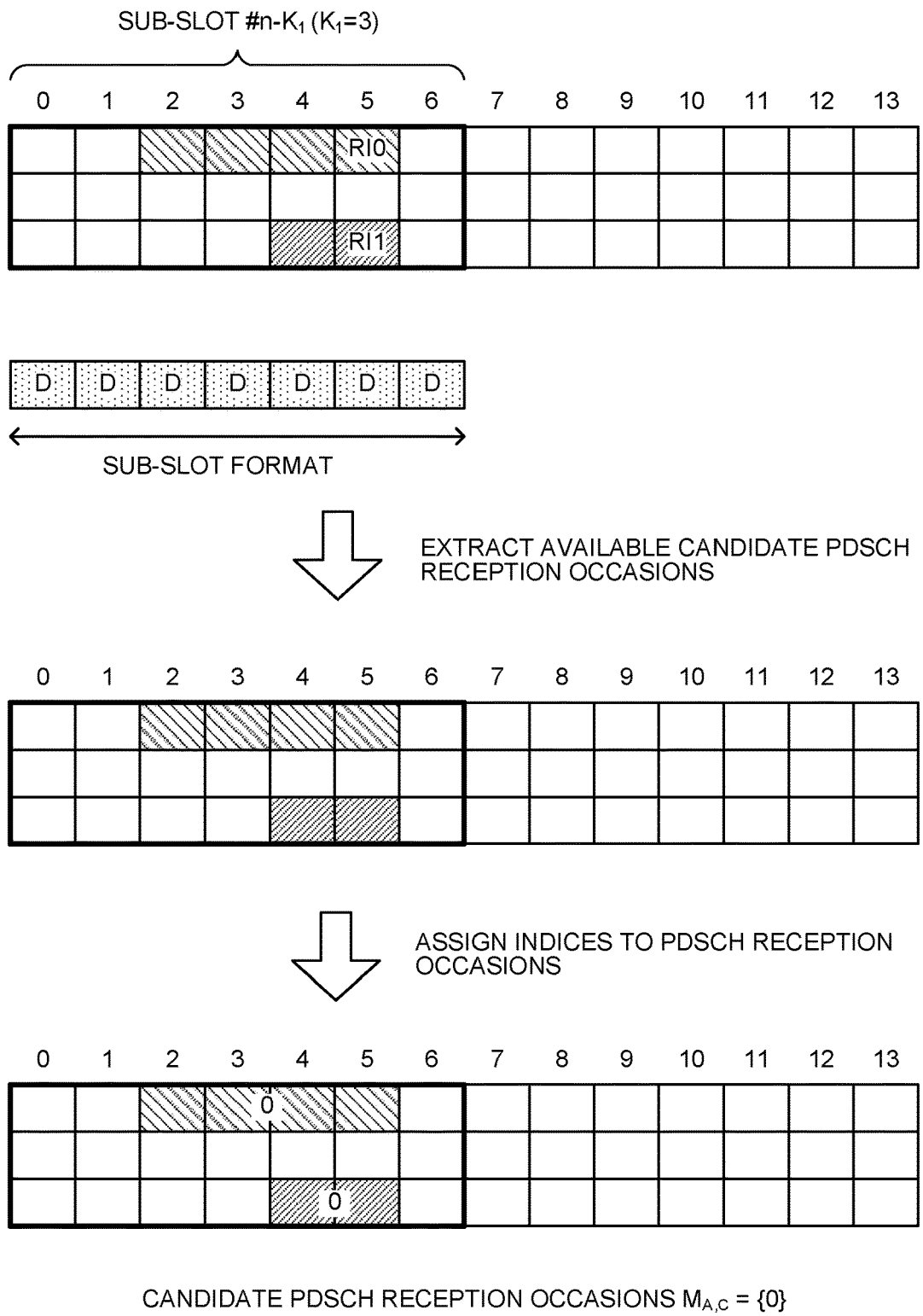
FIG. 7 is a diagram to show the first example of semi-static codebook determination operation at the sub-slot level according to the first aspect.

FIG. 7 shows a case in which sub-slot #n-$K_1$ is a format whose constituent symbols are all downlink symbols (D). In the sub-slot #n-$K_1$ (for example, sub-slot #n-3 of FIG. 5B), the UE can use all of the candidate PDSCH reception occasions $M_{A,c}$ that belong to sub-table 1 shown in the example of FIG. 6B.

Accordingly, as shown in FIG. 7, all of the candidate PDSCH reception occasions $M_{A,c}$ determined based on each of RI=0 and 1 of sub-table 1 of FIG. 6B are extracted, and indices (identifiers or IDs) are assigned to the extracted candidate PDSCH reception occasions $M_{A,c}$. Here, the same index may be assigned to a plurality of candidate PDSCH reception occasions $M_{A,c}$ whose at least some of the symbols overlap (collide).

For example, in FIG. 7, some of the symbols of two candidate PDSCH reception occasions $M_{A,c}$ determined based on RI=0 and 1 of sub-table 1 of FIG. 6B overlap, and thus the same index "0" is assigned to these candidate PDSCH reception occasions $M_{A,c}$.

A certain number (for example, 1 bit) of HARQ-ACK bits may be generated for the candidate PDSCH reception occasions of each index belonging to sub-slot #n-$K_1$. For example, in FIG. 7, one UE may generate the semi-static HARQ-ACK codebook including a certain number of HARQ-ACK bits corresponding to one candidate PDSCH reception occasion $M_{A,c}$ in sub-slot #n-$K_1$.

<<Case in which $K_1$=2>>

Figure 8:
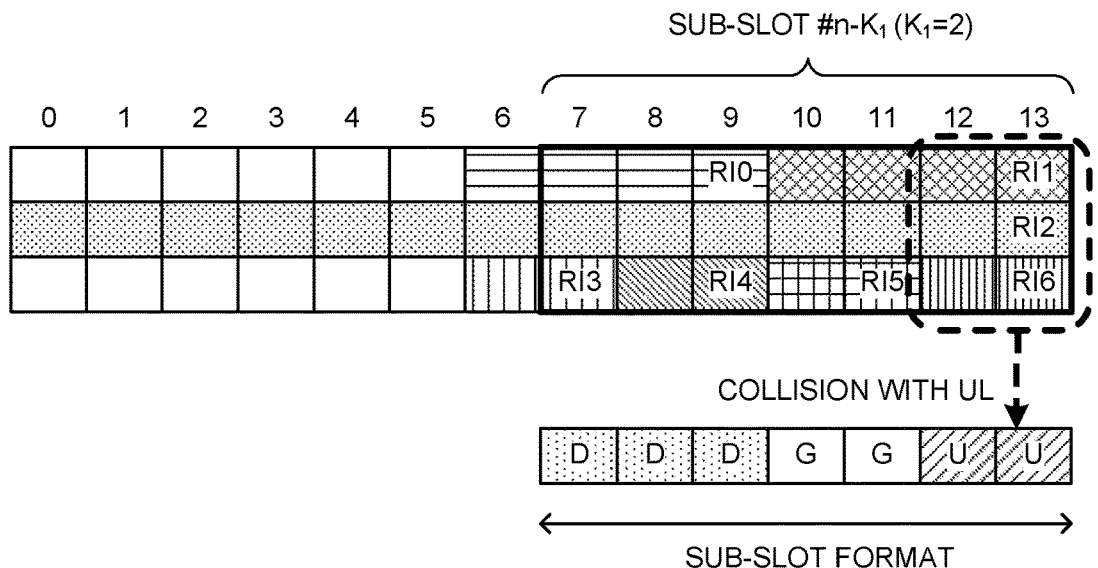
FIG. 8 is a diagram to show the second example of the semi-static codebook determination operation at the sub-slot level according to the first aspect.
Figure 8:
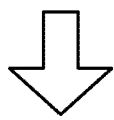
Figure 8:
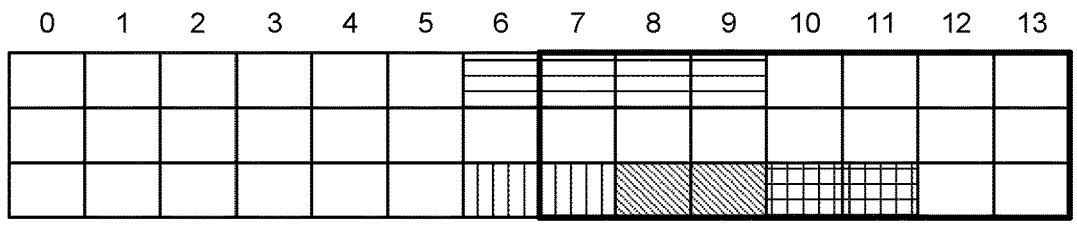
Figure 8:
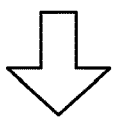
Figure 8:
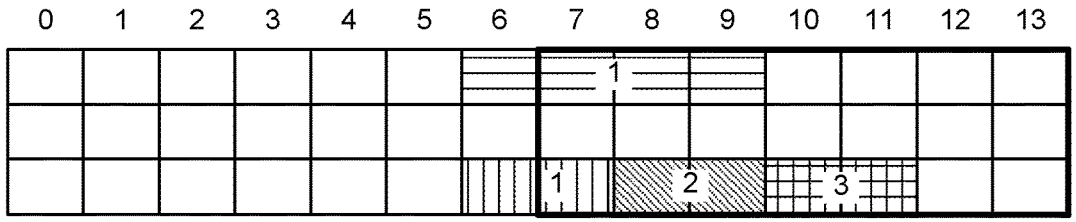

FIG. 8 shows a case in which sub-slot #n-$K_1$ is a format including downlink symbols (D), uplink symbols (U), and guard periods (G). In the sub-slot #n-$K_1$ (for example, sub-slot #n-2 of FIG. 5B), the UE can use all of the candidate PDSCH reception occasions $M_{A,c}$ that belong to sub-table 2 shown in the example of FIG. 6C.

In the case shown in FIG. 8, the candidate PDSCH reception occasions including uplink symbols (for example, the candidate PDSCH reception occasions determined based on RI=1, 2, and 6 of sub-table 2 of FIG. 6C) cannot be used in sub-slot #n-$K_1$. This is because the UE cannot receive the PDSCH in the uplink symbols.

Accordingly, as shown in FIG. 8, all of the candidate PDSCH reception occasions $M_{A,c}$ determined based on each of RI=0 and 3 to 5 except the candidate PDSCH reception occasions determined based on RI=1, 2, and 6 of sub-table 2 of FIG. 6C are extracted, and indices (identifiers or IDs) are assigned to the extracted candidate PDSCH reception occasions $M_{A,c}$.

Note that the indices may be assigned with serial numbers in the set C ($K_1$) of HARQ-ACK timing values $K_1$. For example, as described with reference to FIG. 7, in the case in which $K_1$=3, the index "0" is assigned to the candidate PDSCH reception occasions $M_{A,c}$ in sub-slot #n-$K_1$. For this reason, in the case in which $K_1$=2 shown in FIG. 8, succeeding indices "1" to "3" may be assigned to the candidate PDSCH reception occasions $M_{A,c}$ in sub-slot #n-$K_1$.

As described above, the same index may be assigned to a plurality of candidate PDSCH reception occasions $M_{A,c}$ whose at least some of the symbols overlap (collide). For example, in FIG. 8, some of the symbols of two candidate PDSCH reception occasions $M_{A,c}$ determined based on RI=0 and 3 of sub-table 2 of FIG. 6C overlap, and thus the same index "1" is assigned to these candidate PDSCH reception occasions $M_{A,c}$.

In this manner, in the UE, the semi-static HARQ-ACK codebook corresponding to the candidate PDSCH reception occasions $M_{A,c}$ in sub-slot #n-$K_1$ ($K_1$=3, 2) may include a certain number (for example, 4 bits) of HARQ-ACK bits corresponding to the candidate PDSCH reception occasions identified with different indices (values) "0" to "3".

<<Case in which $K_1$=1>>

Figure 9:
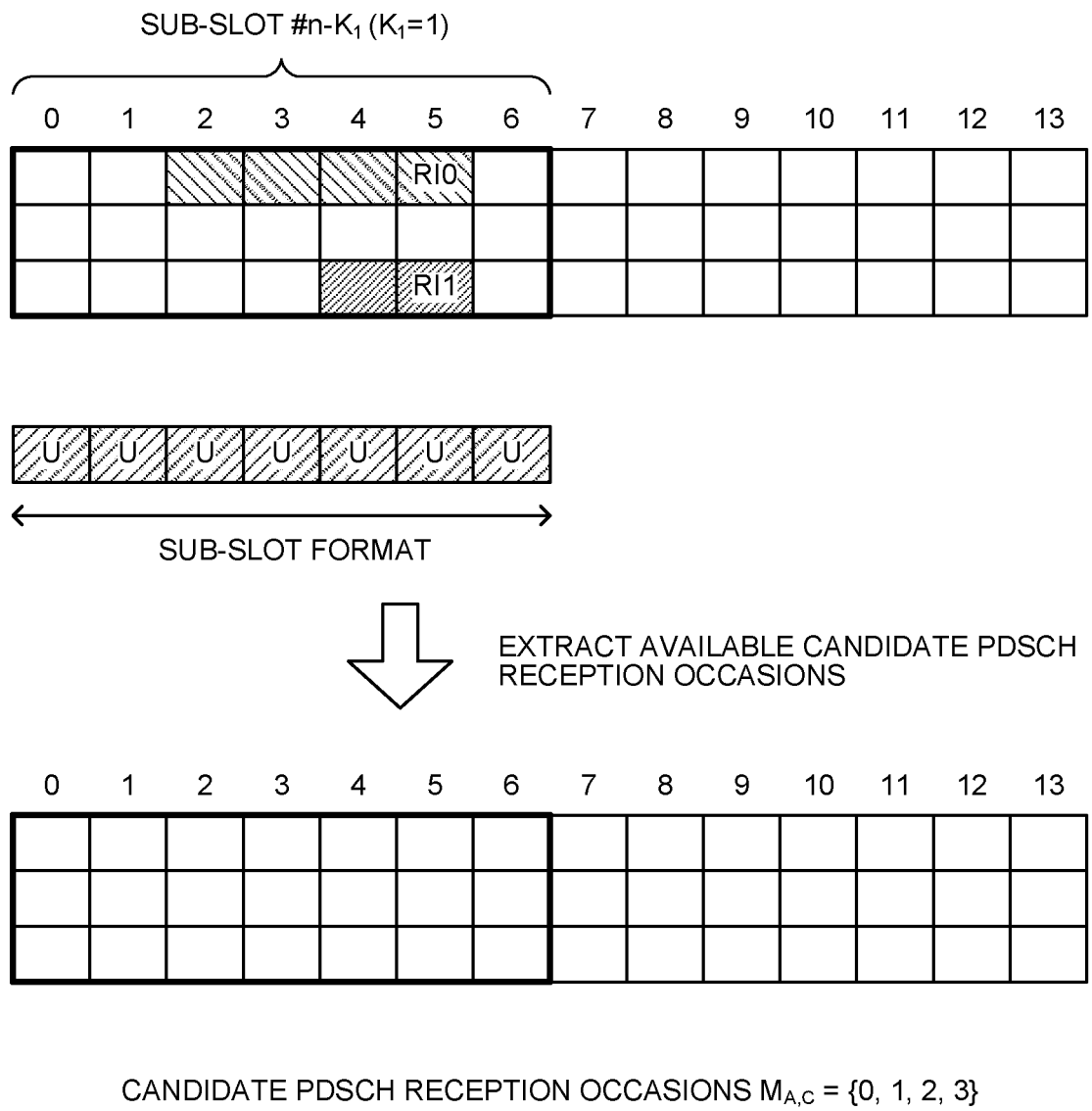
FIG. 9 is a diagram to show the third example of the semi-static codebook determination operation at the sub-slot level according to the first aspect.

FIG. 9 shows a case in which sub-slot #n-$K_1$ is a format whose constituent symbols are all uplink symbols (U). In the sub-slot #n-$K_1$ (for example, sub-slot #n-1 of FIG. 5B), the UE cannot use all of the candidate PDSCH reception occasions $M_{A,c}$ that belong to sub-table 1 shown in the example of FIG. 6B.

Accordingly, as shown in FIG. 9, available candidate PDSCH reception occasions need not be extracted in sub-slot #n-$K_1$. In this case, the HARQ-ACK bits corresponding to sub-slot #n-$K_1$ ($K_1$=1) shown in FIG. 9 need not be included in the semi-static HARQ-ACK codebook corresponding to C ($K_1$)=3, 2, 1.

As described above, in the first aspect, the candidate PDSCH reception occasions indicated in respective rows in the PDSCH time domain RA table are grouped for each sub-slot, based on the HARQ-ACK timing value $K_1$ at the sub-slot level. Therefore, the UE can appropriately determine the semi-static HARQ-ACK codebook, based on the HARQ-ACK timing value K1 at the sub-slot level.

(Second Aspect)

The second aspect assumes a case in which the UE supports a plurality of services (for example, both of the eMBB service and the URLLC service) having different requirements. However, the present invention is not limited to this case.

<Precondition>

In the second aspect, the UE may support transmission of a plurality of PUCCHs for the HARQ-ACK in one slot.

In the second aspect, the UE can identify the plurality of services (for example, the eMBB service and the URLLC service) according to a certain rule. For example, the UE may identify to which service traffic belongs, based on at least one parameter of the following:

DCI format

Certain field value in the DCI

Radio network temporary identifier (RNTI) used for CRC scramble of the DCI

Monitoring occasion of a downlink control channel (Physical Downlink Control Channel (PDCCH))

For example, when the DCI for scheduling the PDSCH is subjected to CRC scrambling by using an MCS-C-RNTI, the UE may recognize that data transmitted on the PDSCH corresponds to the URLLC service.

Note that the following will describe an example in which the UE supports the eMBB service and the URLLC service as the plurality of services having different requirements in the same carrier (also referred to as a cell, a component carrier, a service cell, or the like) (or the same BWP). However, the present invention is not limited to this example. In a layer (for example, the physical layer or the like) that is lower than a certain layer, the UE may apply a different operation (for example, a different semi-static HARQ-ACK codebook determination operation), based on the at least one parameter, without recognizing a type of service itself.

Figure 10:
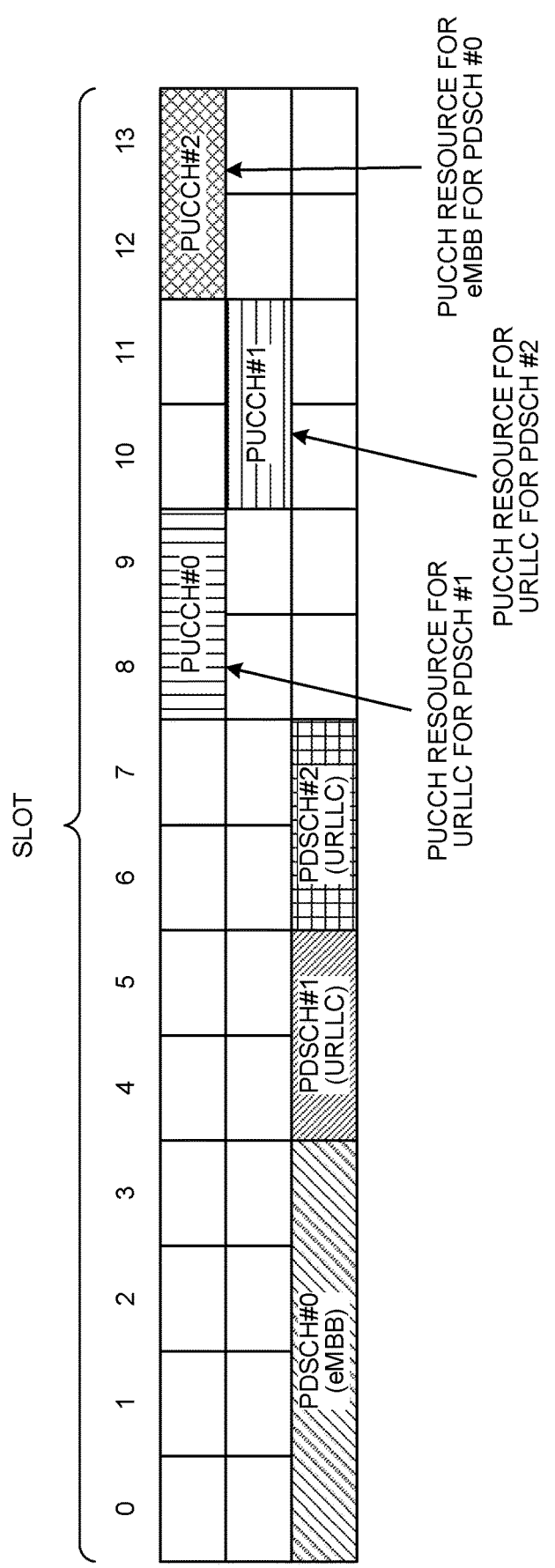
FIG. 10 is a diagram to show an example of a slot according to a precondition of the second aspect.

FIG. 10 is a diagram to show an example of a slot according to the precondition of the second aspect. FIG. 10 shows an example in which a plurality of PDSCHs corresponding to different services (for example, the eMBB service and the URLLC service) are scheduled in the same slot. For example, in FIG. 10, PDSCH #0 corresponding to the eMBB service and PDSCHs #1 and #2 belonging to the URLLC service are scheduled in the same slot.

In FIG. 10, the UE may transmit a plurality of PUCCHs in a respective plurality of PUCCH resources allocated in the same slot. For example, in FIG. 10, PUCCH resource #0 for URLLC corresponding to PDSCH #1, PUCCH resource #1 for URLLC corresponding to PDSCH #2, and PUCCH resource #2 for eMBB corresponding to PDSCH #0 are allocated.

As shown in FIG. 10, the UE may assume that the plurality of PUCCH resources corresponding to the different services are orthogonal to one another (do not overlap, or are allocated to different symbols) at least in the time domain.

Alternatively, when the plurality of PUCCH resources corresponding to the different services overlap in at least one of the time domain and the frequency domain, the UE may drop the PUCCH resource corresponding to a specific service (for example, the eMBB service), or may multiplex UCI (for example, the HARQ-ACK for the eMBB service) corresponding to the specific service on the PUCCH for another service (for example, the URLLC service).

<Semi-Static HARQ-ACK Codebook Determination for Each Service>

In the second aspect, determination of the semi-static HARQ-ACK codebook for each service will be described. Specifically, any one of the first to fourth methods may be used.

<<First Method>>

In the first method, the same granularity of the HARQ-ACK timing value $K_1$ and the same PDSCH time domain RA table may be used between the plurality of services (for example, the eMBB service and the URLLC service).

The granularity of the HARQ-ACK timing value $K_1$ may be at the slot level or may be at the sub-slot level.

The UE may determine the HARQ-ACK window (set C ($K_1$)) of HARQ-ACK timing values Kd so as to be common to the plurality of services. For each HARQ-ACK timing value $K_1$, the UE may determine the set of candidate PDSCH reception occasions to be common to the plurality of services, based on the PDSCH time domain RA table and a format of a certain time unit (for example, the slot or the sub-slot). Indices may be assigned to each of the candidate PDSCH reception occasions in the HARQ-ACK window so as to be common to the plurality of services.

On the other hand, the UE may generate (configure, determine) the semi-static HARQ-ACK codebooks separately for the plurality of services. The UE may determine the size of the semi-static HARQ-ACK codebook for each service, based on the indices (a total number thereof) that are assigned to each of the candidate PDSCH reception occasions in the HARQ-ACK window so as to be common to the plurality of services.

The UE may transmit the semi-static HARQ-ACK codebook generated for each service by using the PUCCH resource determined for each service. The PUCCH resource determined for each service may be included in the same time unit (for example, the slot or the sub-slot). In this case, the UE can transmit a plurality of PUCCHs in the same time unit.

The UE may determine the PUCCH resource, based on a value of a certain field in the most recent (latest) DCI in the HARQ-ACK window for each service. The certain field may be referred to as a PUCCH resource identifier (PUCCH resource indicator/indication (PRI)) field, an ACK/NACK resource identifier (ACK/NACK Resource Indicator (ARI)) field, an ACK/NACK resource offset (ARO) field, or the like. The value of the certain field is also referred to as a PRI, an ARI, an ARO, or the like.

[Slot Level]

Figure 11:
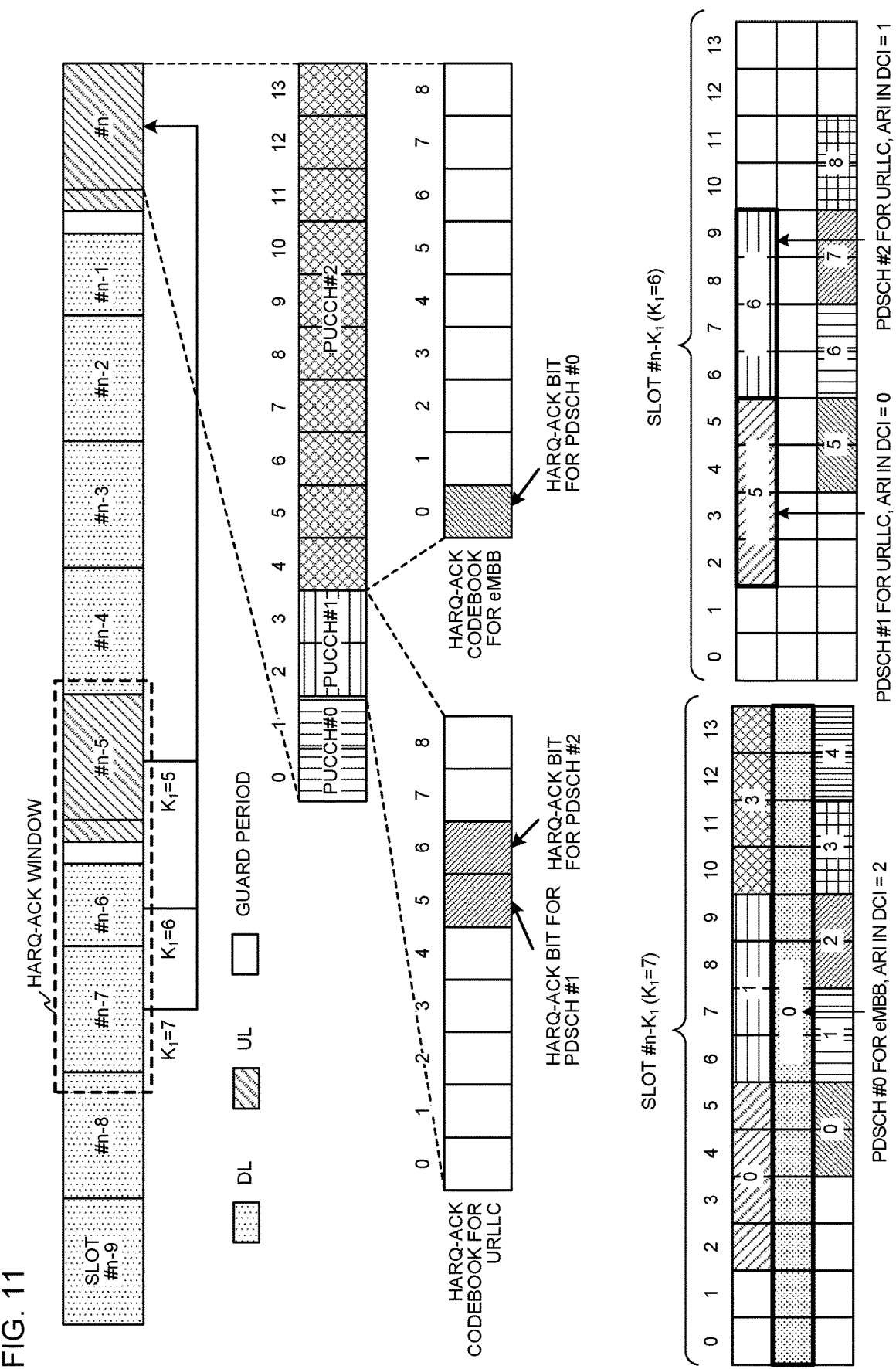
FIG. 11 is a diagram to show an example of semi-static HARQ-ACK codebook determination operation at the slot level according to the first method of the second aspect.

FIG. 11 is a diagram to show an example of the semi-static HARQ-ACK codebook determination operation at the slot level according to the first method of the second aspect. In FIG. 11, the UE may determine the set of candidate PDSCH reception occasions $M_{A,c}$ in slot #n-$K_1$ for each HARQ-ACK timing value $K_1$, according to the semi-static HARQ codebook determination operation at the slot level (see, for example, FIGS. 1A to 1C and 2 to 4).

In the case shown in FIG. 11, the candidate PDSCH reception occasions $M_{A,c}$ assigned the indices "0" to "8" are available in the HARQ-ACK window (corresponding to the set C ($K_1$) of HARQ-ACK timing values $K_1=\{7, 6, 5\}$). Note that the method of assigning the indices "0" to "8" is as described with reference to FIGS. 2 to 4.

FIG. 11 assumes a case in which retransmission control in the unit of the CBG with the number of layers being 1 is not configured for the UE. In this case, each of the HARQ-ACK codebook for URLLC and the HARQ-ACK codebook for eMBB may include $M_c$ (=9) bits, $M_c$ being a number as many as the candidate PDSCH reception occasions $M_{A,c}$ having different indices in the HARQ-ACK window.

For example, in FIG. 11, PDSCH #0 for eMBB is allocated to candidate PDSCH reception occasion #0 that includes symbols #0 to #13 in slot #n-$K_1$ ($K_1$=7). PDSCHs #1 and #2 for URLLC are respectively allocated to candidate PDSCH reception occasions #5 and #6 that respectively include symbols #2 to #5 and symbols #6 to #9 in slot #n-$K_1$ ($K_1$=7).

The UE may determine the RI in the PDSCH time domain RA table (for example, FIG. 1B), based on at least one of a value of a certain field (for example, a time domain resource allocation (Time domain resource assignment) field) of the DCI and the higher layer parameter (for example, "pdsch-TimeDomainAllocationList" of an RRC control element), and may determine candidate PDSCH reception occasions #0, #5, and #6 to which PDSCHs #0 to #2 are allocated, based on the rows of the RI.

In FIG. 11, the ARI in the DCI for scheduling PDSCH #0 for eMBB is 2. For this reason, the UE may determine PUCCH resource #2 to be used for transmission of the semi-static HARQ-ACK codebook for eMBB (HARQ-ACK codebook for eMBB), based on the ARI.

In slot #n-$K_1$ ($K_1$=7), PDSCH #0 for eMBB is allocated to candidate PDSCH reception occasion #0 that includes symbols #0 to #13. For this reason, the HARQ-ACK bits for the PDSCH #0 are mapped to the positions corresponding to the candidate PDSCH reception occasion index "0" in the HARQ-ACK codebook for eMBB.

On the other hand, in FIG. 11, the ARI in the DCI for scheduling PDSCHs #1 and 2 for URLLC is 0 and 1. As described above, when a plurality of ARIs for the same service are detected in the same HARQ-ACK window, the UE may determine PUCCH resource #1 to be used for transmission of the semi-static HARQ-ACK codebook for URLLC (HARQ-ACK codebook for URLLC), based on the ARI that is most recently detected (for example, in FIG. 11, "ARI=1" in the DCI for scheduling PDSCH #2).

In slot #n-$K_1$ ($K_1$=6), PDSCHs #1 and #2 for URLLC are respectively allocated to candidate PDSCH reception occasions #5 and #6 that respectively include symbols #2 to #5 and symbols #6 to #9. For this reason, the HARQ-ACK bits for the PDSCHs #1 and #2 are mapped to the positions corresponding to the candidate PDSCH reception occasion indices "5" and "6" in the HARQ-ACK codebook for URLLC.

[Sub-Slot Level]

Figure 12:
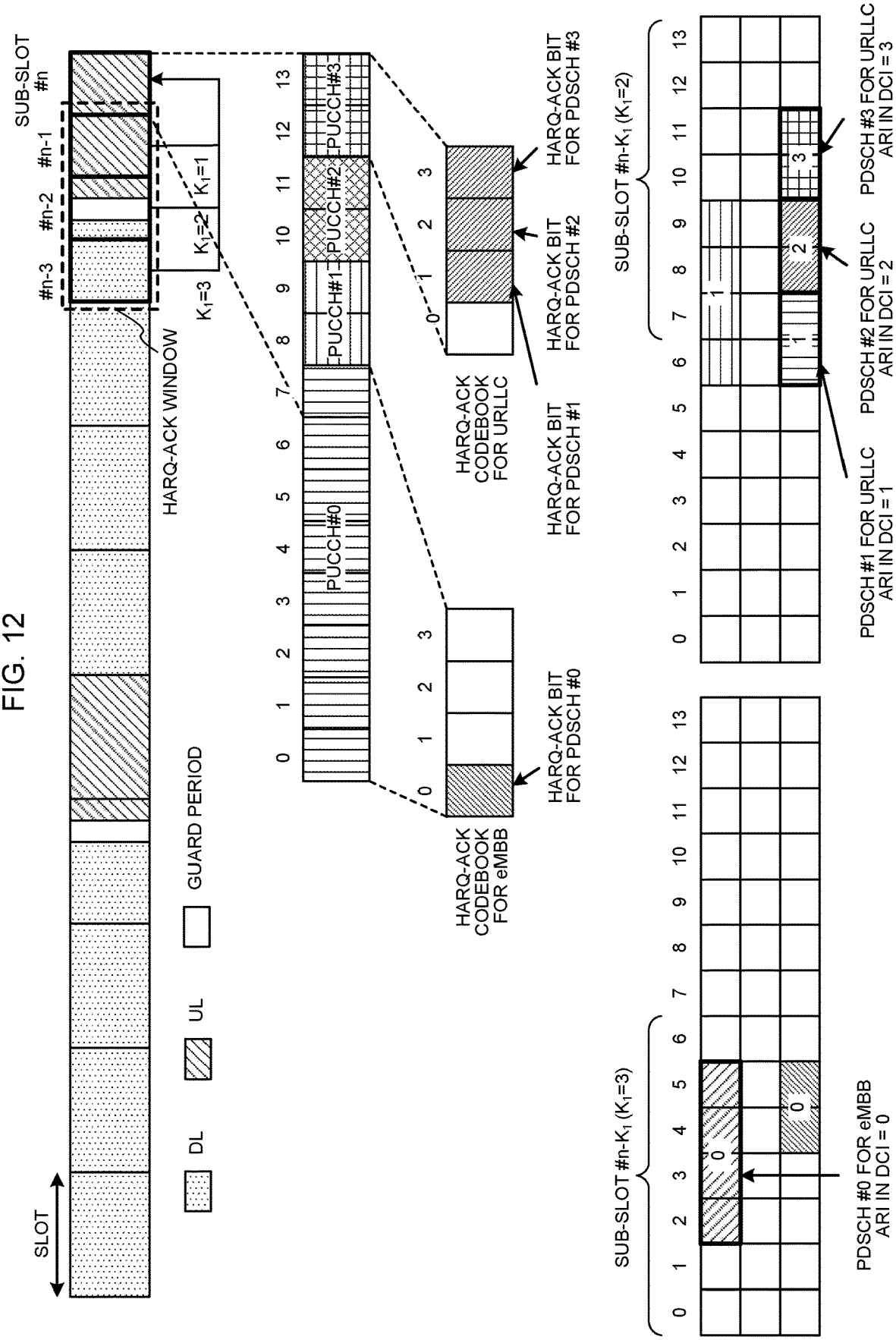
FIG. 12 is a diagram to show an example of the semi-static HARQ-ACK codebook determination operation at the sub-slot level according to the first method of the second aspect.

FIG. 12 is a diagram to show an example of the semi-static HARQ-ACK codebook determination operation at the sub-slot level according to the first method of the second aspect. In FIG. 12, the UE may determine the set of candidate PDSCH reception occasions $M_{A,c}$ in sub-slot #n-$K_1$ for each HARQ-ACK timing value $K_1$, according to the semi-static HARQ codebook determination operation at the sub-slot level (see, for example, FIGS. 5B, 6A to 6C, and 7 to 9). Note that, in FIG. 12, difference from FIG. 11 will be mainly described.

In the case shown in FIG. 12, in the HARQ-ACK window (set C ($K_1$) of HARQ-ACK timing values $K_1=\{3, 2, 1\}$), the candidate PDSCH reception occasions $M_{A,c}$ assigned the indices "0" to "3" are available. Note that the method of assigning the indices "0" to "3" is as described with reference to FIGS. 7 to 9.

FIG. 12 assumes a case in which retransmission control in the unit of the CBG with the number of layers being 1 is not configured for the UE. Thus, each of the HARQ-ACK codebook for URLLC and the HARQ-ACK codebook for eMBB may include $M_c$ (=4) bits, $M_c$ being a number as many as the available candidate PDSCH reception occasions $M_{A,c}$ in the HARQ-ACK window.

For example, in FIG. 12, PDSCH #0 for eMBB is allocated to candidate PDSCH reception occasion #0 that includes symbols #2 to #5 belonging to sub-slot #n-$K_1$ ($K_1$=3). PDSCHs #1 to #3 for URLLC are respectively allocated to candidate PDSCH reception occasions #1 to #3 belonging to sub-slot #n-$K_1$ ($K_1$=2).

The UE may determine the RI in the PDSCH time domain RA table (for example, FIG. 1B), based on at least one of the value of the certain field (for example, the time domain resource allocation field) in the DCI and the higher layer parameter (for example, "pdsch-TimeDomainAllocation-List" of the RRC control element), and may determine candidate PDSCH reception occasions #0 to #3 in which PDSCHs #0 to #3 are scheduled, based on the rows of the RI.

For example, in FIG. 12, the ARI in the DCI for scheduling PDSCH #0 for eMBB is 0. For this reason, the UE may determine PUCCH resource #0 to be used for transmission of the HARQ-ACK codebook for eMBB, based on the ARI. Note that, in sub-slot #n determined based on the HARQ-ACK timing value $K_1$, at least some of the symbols of the PUCCH resource #0 may be included (some of the symbols need not be included in sub-slot #n).

In sub-slot #n-$K_1$ ($K_1$=3), PDSCH #0 for eMBB is allocated to candidate PDSCH reception occasion #0 that includes symbols #2 to #5. For this reason, the HARQ-ACK bits for the PDSCH #0 are mapped to the positions corresponding to the candidate PDSCH reception occasion index "0" in the HARQ-ACK codebook for eMBB.

On the other hand, in FIG. 12, the ARI in the DCI for scheduling PDSCHs #1 to #3 for URLLC is 1 to 3. As described above, when a plurality of ARIs for the same service are detected in the same HARQ-ACK window, the UE may determine PUCCH resource #3 to be used for transmission of the HARQ-ACK codebook for URLLC, based on the ARI that is most recently detected (for example, in FIG. 12, "ARI=3" in the DCI for scheduling PDSCH #3).

In slot #n-$K_1$ ($K_1$=2), PDSCHs #1 to #3 for URLLC are respectively allocated to candidate PDSCH reception occasions #1 to #3. For this reason, the HARQ-ACK bits for the PDSCHs #1 to #3 are mapped to the positions corresponding to the candidate PDSCH reception occasion indices "1" to "3" in the HARQ-ACK codebook for URLLC.

As described above, in the first method, the same granularity of the HARQ-ACK timing value $K_1$ and the same PDSCH time domain RA table are used between the plurality of services. Therefore, the semi-static HARQ-ACK codebook having the same size can be generated between the plurality of services.

<<Second Method>>

In the second method, the same granularity of the HARQ-ACK timing value $K_1$ and a different PDSCH time domain RA table or a different row in a common PDSCH time domain RA table are used between the plurality of services (for example, the eMBB service and the URLLC service). Note that, in the second method, difference from the first method will be mainly described.

FIGS. 13A and 13B are each a diagram to show an example of the PDSCH time domain RA for each service according to the second method of the second aspect. The set of candidate PDSCH reception occasions different between the plurality of services may be indicated by a different row in the PDSCH time domain RA table common to the plurality of services (FIG. 13A), or may be indicated by the PDSCH time domain RA table specific to the plurality of services (FIG. 13B).

For example, in FIG. 13A, the set of candidate PDSCH reception occasions for URLLC is indicated by the rows of RI=0 to 8 in the PDSCH time domain RA table common to the URLLC service and the eMBB service. On the other hand, the set of candidate PDSCH reception occasions for URLLC is indicated by the rows of RI=9 to 11 in the PDSCH time domain RA table.

On the other hand, in FIG. 13B, the PDSCH time domain RA table for the eMBB service and the PDSCH time domain RA table for the URLLC service may be configured or may be defined in advance. In FIG. 13B, the set of candidate PDSCH reception occasions for URLLC is indicated by the rows of the PDSCH time domain RA table for the eMBB service. On the other hand, the set of candidate PDSCH reception occasions for URLLC is indicated by the rows of the PDSCH time domain RA table for the URLLC service.

The UE may generate (configure, determine) the semi-static HARQ-ACK codebook for each service, based on the set of candidate PDSCH reception occasions $M_{A,c}$ for each service. The UE may determine the size of the semi-static HARQ-ACK codebook for each service, based on the candidate PDSCH reception occasion indices (a total number thereof) for each service.

The UE may transmit the semi-static HARQ-ACK codebook generated for each service by using the PUCCH resource determined for each service. The UE can determine the PUCCH resource for each service, as has been described in the first method.

[Slot Level]

Figure 14:
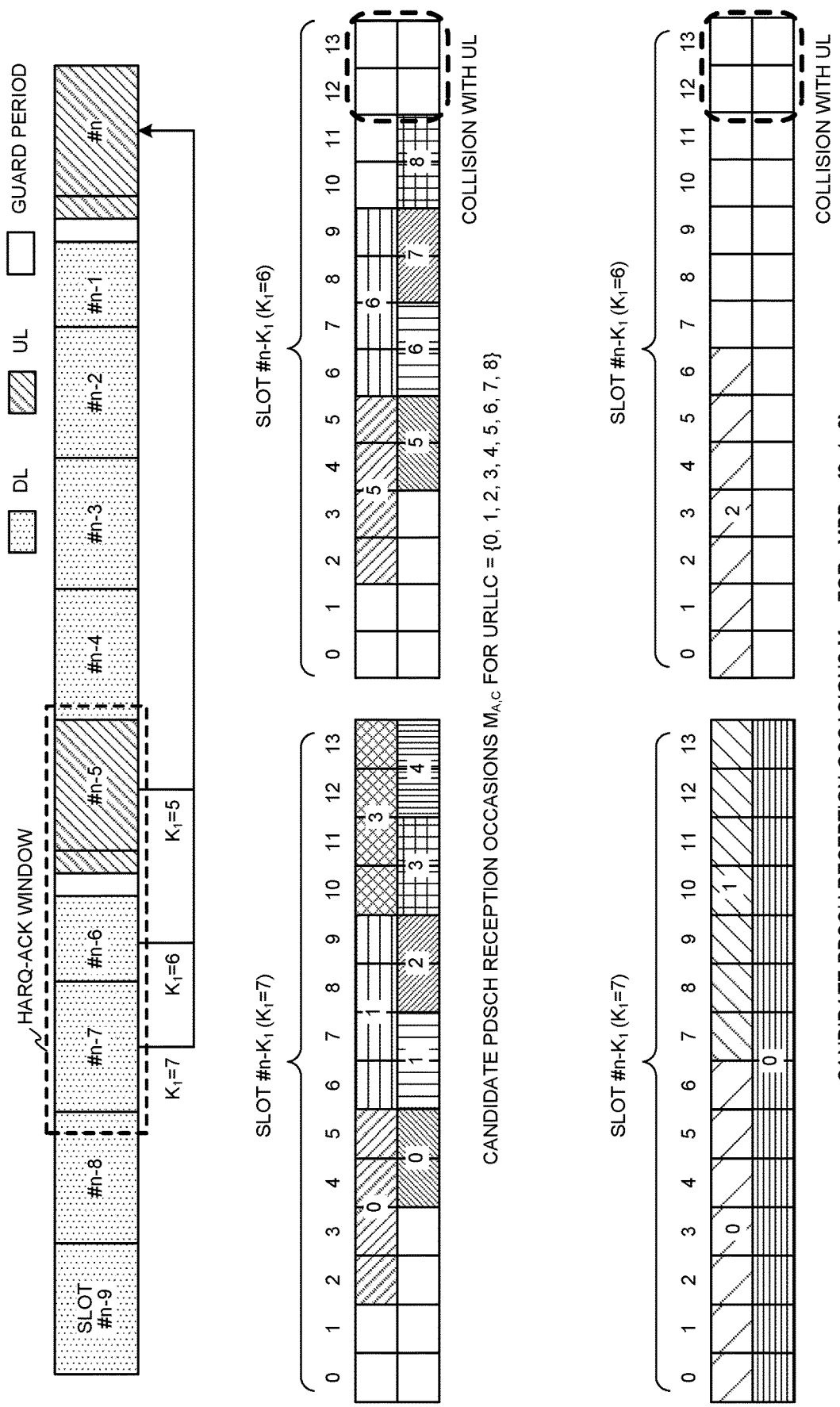
FIG. 14 is a diagram to show an example of a set of candidate PDSCH reception occasions for each service that is determined based on a HARQ-ACK timing value $K_1$ at the slot level according to the second method of the second aspect.

FIG. 14 is a diagram to show an example of the set of candidate PDSCH reception occasions for each service that is determined based on the HARQ-ACK timing value $K_1$ at the slot level. FIG. 14 shows the PDSCH time domain RA table common to the services shown in FIG. 13A or the PDSCH time domain RA table for each service shown in FIG. 13B, and the candidate PDSCH reception occasions for each service that is determined based on a format of the slot.

Specifically, the UE may determine the HARQ-ACK window (set C ($K_1$) of HARQ-ACK timing values $K_1$) so as to be common to the plurality of services. For each HARQ-ACK timing value $K_1$, the UE may determine the set of candidate PDSCH reception occasions for each service, based on the PDSCH time domain RA table of FIG. 13A or FIG. 13B and a format of a certain time unit. Indices for each service may be assigned to each of the candidate PDSCH reception occasions in the HARQ-ACK window.

For example, in FIG. 14, the candidate PDSCH reception occasions assigned the indices "0" to "8" are included in the set of candidate PDSCH reception occasions $M_{A,c}$ available for the URLLC service in the HARQ-ACK window. On the other hand, the candidate PDSCH reception occasions assigned the indices "0" to "2" are included in the set of candidate PDSCH reception occasions $M_{A,c}$ available for the eMBB service in the HARQ-ACK window.

Figure 15:
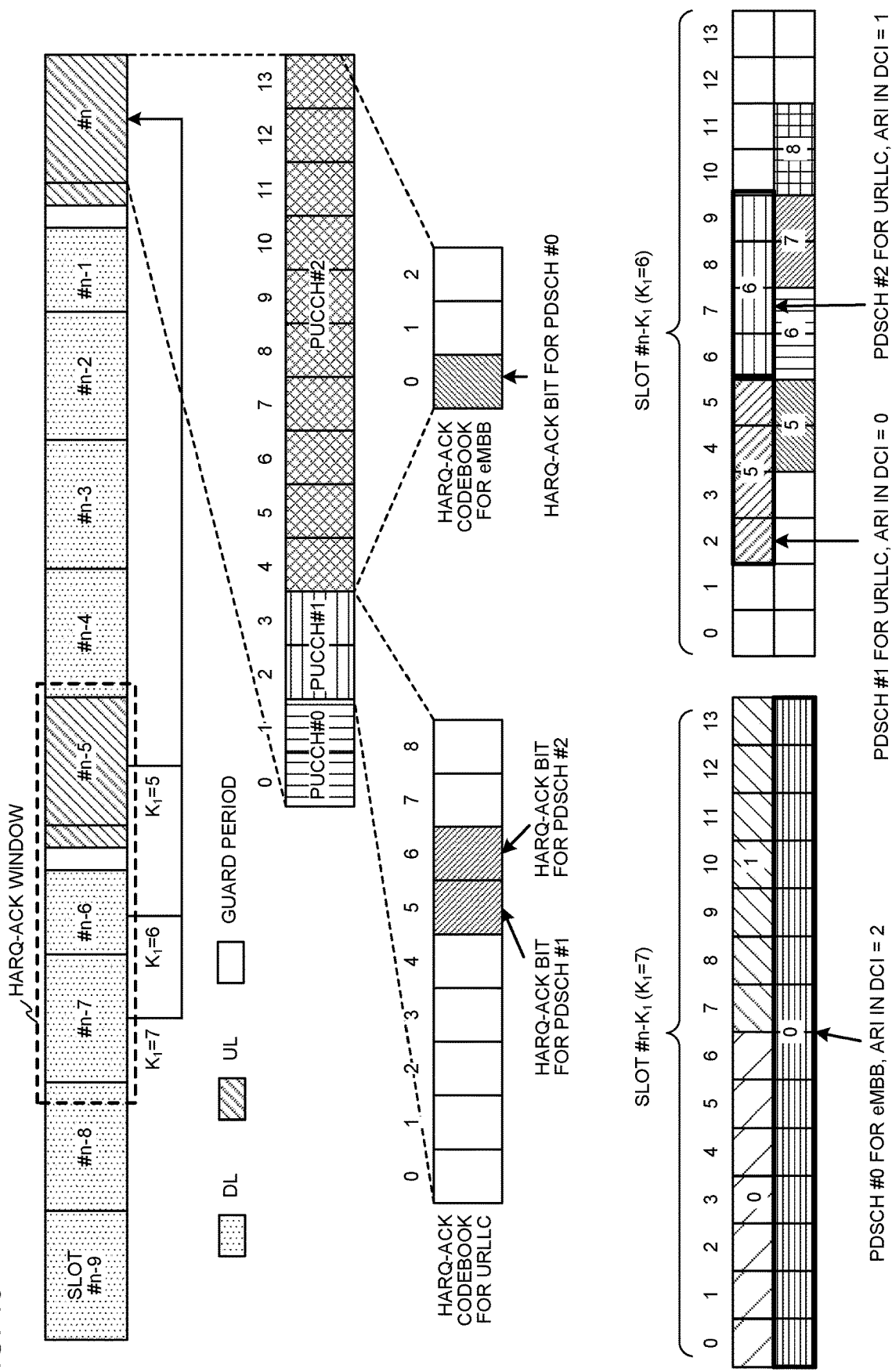
FIG. 15 is a diagram to show an example of the semi-static HARQ-ACK codebook determination operation at the slot level according to the second method of the second aspect.

FIG. 15 is a diagram to show an example of the semi-static HARQ-ACK codebook determination operation at the slot level according to the second method of the second aspect. In FIG. 15, the UE may determine the set of candidate PDSCH reception occasions $M_{A,c}$ in slot #n-$K_1$ for each service and for each HARQ-ACK timing value $K_1$, according to the semi-static HARQ codebook determination operation at the slot level (see, for example, FIGS. 1A to 1C and 2 to 4).

As described with reference to FIG. 14, in the HARQ-ACK window (corresponding to the set C ($K_1$) of HARQ-ACK timing values $K_1$={7, 6, 5}), the candidate PDSCH reception occasions $M_{A,c}$ assigned the indices "0" to "8" are available for the URLLC service. For this reason, in a case in which retransmission control in the unit of the CBG with the number of layers being 1 is not configured for the UE, the HARQ-ACK codebook for URLLC may include 9 bits.

On the other hand, in the HARQ-ACK window (corresponding to the set C ($K_1$) of HARQ-ACK timing values $K_1$={7, 6, 5}), the candidate PDSCH reception occasions $M_{A,c}$ assigned the indices "0" to "2" are available for the eMBB service. For this reason, in a case in which retransmission control in the unit of the CBG with the number of layers being 1 is not configured for the UE, the HARQ-ACK codebook for eMBB may include 3 bits.

As described above, when the available candidate PDSCH reception occasions $M_{A,\,c}$ are determined in the HARQ-ACK window for each service, the size of the HARQ-ACK codebook for at least one service can be reduced.

For example, in FIG. 15, PDSCH #0 for eMBB is allocated to candidate PDSCH reception occasion #0 for eMBB that includes symbols #0 to #13 in slot #n-$K_1$ ($K_1$=7). The HARQ-ACK bits for the PDSCH #0 are mapped to the positions corresponding to the candidate PDSCH reception occasion index "0" in the HARQ-ACK codebook for eMBB.

The ARI in the DCI for scheduling the PDSCH #0 is 2. For this reason, the UE may determine PUCCH resource #2 to be used for transmission of the HARQ-ACK codebook for eMBB, based on the ARI.

In slot #n-$K_1$ ($K_1$=6), PDSCHs #1 and #2 for URLLC are respectively allocated to candidate PDSCH reception occasions #5 and #6 that respectively include symbols #2 to #5 and symbols #6 to #9. For this reason, the HARQ-ACK bits for the PDSCHs #1 and #2 are mapped to the positions corresponding to the candidate PDSCH reception occasion indices "5" and "6" in the HARQ-ACK codebook for URLLC.

The ARI in the DCI for scheduling PDSCHs #1 and 2 for URLLC is 0 and 1. As described above, when a plurality of ARIs for the same service are detected in the same HARQ-ACK window, the UE may determine PUCCH resource #1 to be used for transmission of the HARQ-ACK codebook for URLLC, based on the ARI that is most recently detected (for example, in FIG. 15, "ARI=1" in the DCI for scheduling PDSCH #2).

[Sub-Slot Level]

Figure 16:
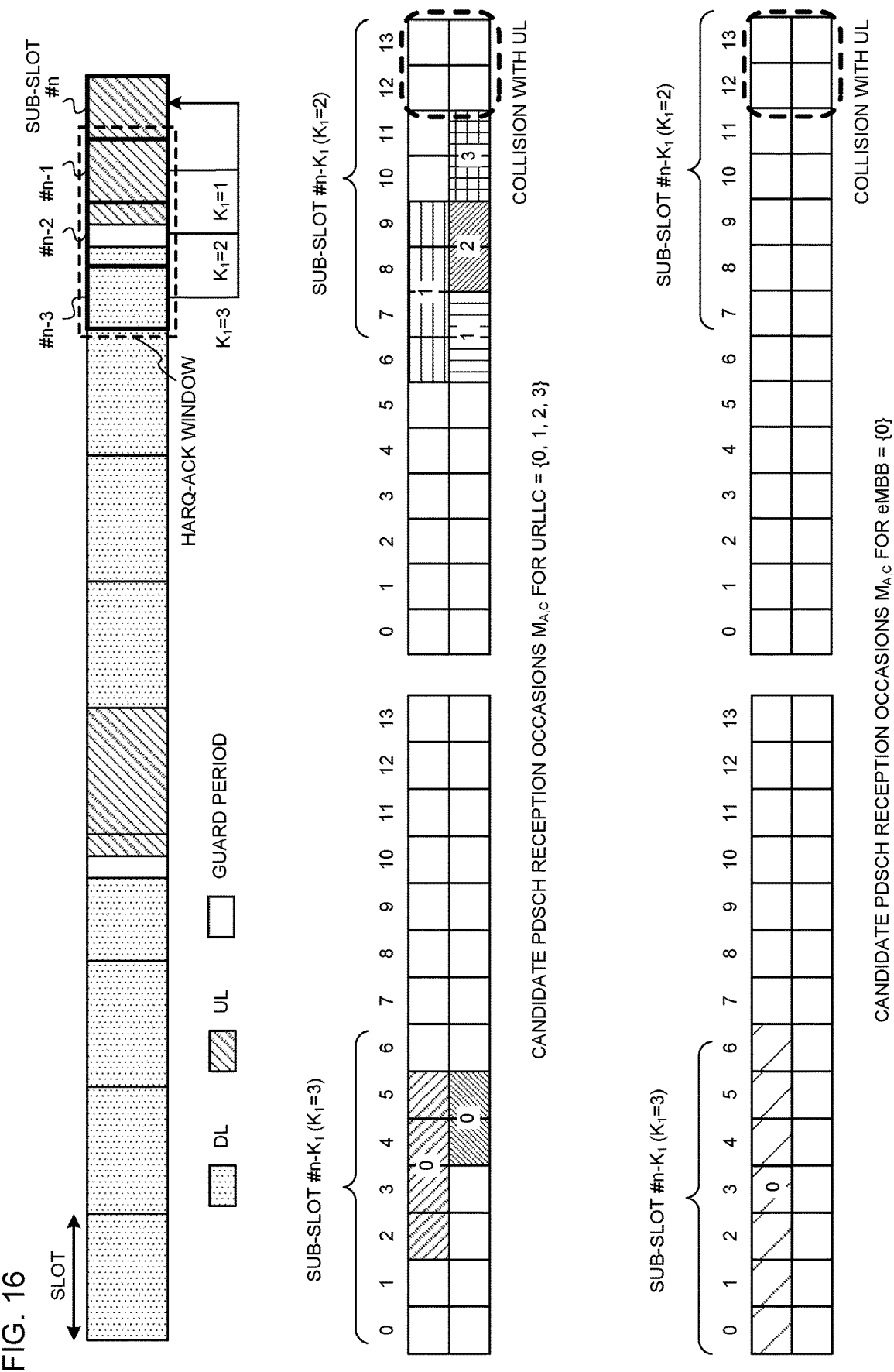
FIG. 16 is a diagram to show an example of the set of candidate PDSCH reception occasions for each service that is determined based on the HARQ-ACK timing value $K_1$ at the sub-slot level.

FIG. 16 is a diagram to show an example of the set of candidate PDSCH reception occasions for each service that is determined based on the HARQ-ACK timing value $K_1$ at the sub-slot level. In FIG. 16, the PDSCH time domain RA table common to the services shown in FIG. 13A or the PDSCH time domain RA table for each service shown in FIG. 13B may be divided into a plurality of sub-tables, based on the number of sub-slots in the slot.

A certain rule for determining to which sub-table for each service each candidate PDSCH reception occasion of each service belongs is as described in the first aspect. For example, in FIG. 16, the sub-table including the row indicating each candidate PDSCH reception occasion may be determined based on to which sub-slot the last symbol of each candidate PDSCH reception occasion of each service belongs.

For each HARQ-ACK timing value $K_1$, the UE may determine the set of candidate PDSCH reception occasions for each service, based on the sub-table of the PDSCH time domain RA table of FIG. 13A or FIG. 13B and a format of a certain time unit (for example, the sub-slot). Indices for each service may be assigned to each of the candidate PDSCH reception occasions in the HARQ-ACK window.

For example, in FIG. 16, the candidate PDSCH reception occasions assigned the indices "0" to "3" are included in the set of candidate PDSCH reception occasions $M_{A,\,c}$ available for the URLLC service in the HARQ-ACK window. On the other hand, the candidate PDSCH reception occasions assigned the index "0" are included in the set of candidate PDSCH reception occasions $M_{A,\,c}$ available for the eMBB service in the HARQ-ACK window.

Figure 17:
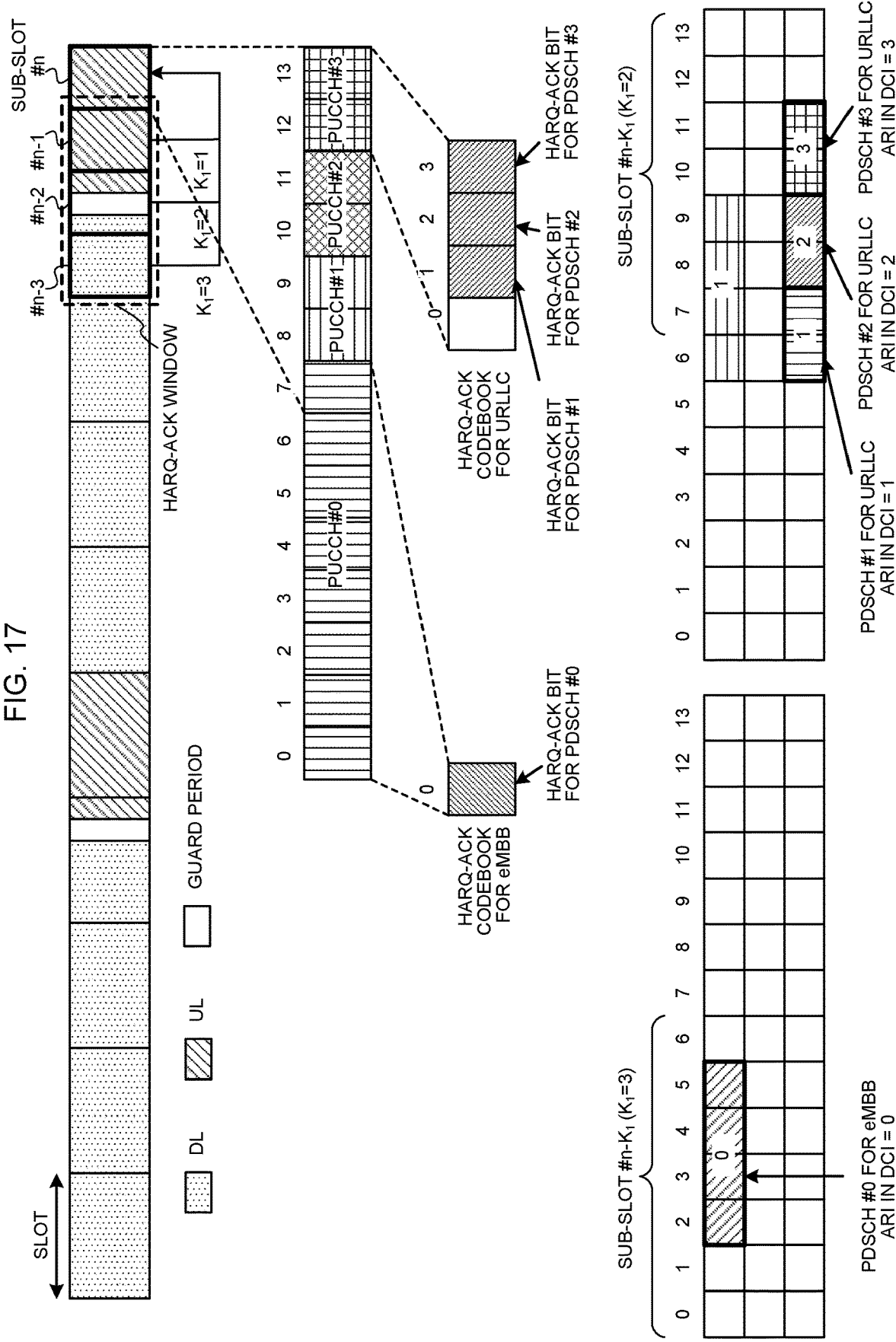
FIG. 17 is a diagram to show an example of the semi-static HARQ-ACK codebook determination operation at the sub-slot level according to the second method of the second aspect.

FIG. 17 is a diagram to show an example of the semi-static HARQ-ACK codebook determination operation at the sub-slot level according to the second method of the second aspect. In FIG. 17, the UE may determine the set of candidate PDSCH reception occasions $M_{A,\,c}$ in sub-slot #n-$K_1$ for each service and for each HARQ-ACK timing value $K_1$, according to the semi-static HARQ codebook determination operation at the sub-slot level (see, for example, FIGS. 5B, 6A to 6C, and 7 to 9).

As described with reference to FIG. 16, in the HARQ-ACK window (corresponding to the set C ($K_1$) of HARQ-ACK timing values $K_1$={3, 2, 1}), the candidate PDSCH reception occasions $M_{A,\,c}$ assigned the indices "0" to "3" are available for the URLLC service. For this reason, in a case in which retransmission control in the unit of the CBG with the number of layers being 1 is not configured for the UE, the HARQ-ACK codebook for URLLC may include 4 bits.

On the other hand, in the HARQ-ACK window (corresponding to the set C ($K_1$) of HARQ-ACK timing values $K_1$={3, 2, 1}), the candidate PDSCH reception occasions $M_{A,\,c}$ assigned the index "0" are available for the eMBB service. For this reason, in a case in which retransmission control in the unit of the CBG with the number of layers being 1 is not configured for the UE, the HARQ-ACK codebook for eMBB may include 1 bit.

For example, in FIG. 17, PDSCH #0 for eMBB is allocated to candidate PDSCH reception occasion #0 for eMBB in sub-slot #n-$K_1$ ($K_1$=3). The HARQ-ACK bits for the PDSCH #0 are mapped to the positions corresponding to the candidate PDSCH reception occasion index "0" in the HARQ-ACK codebook for eMBB.

The ARI in the DCI for scheduling the PDSCH #0 is 0. For this reason, the UE may determine PUCCH resource #0 to be used for transmission of the HARQ-ACK codebook for eMBB, based on the ARI.

In sub-slot #n-$K_1$ ($K_1$=2), PDSCHs #1 to #3 for URLLC are respectively allocated to candidate PDSCH reception occasions #1, #2, and #3 that respectively include symbols #6 to #7, symbols #8 to #9, and symbols #10 to #11. For this reason, the HARQ-ACK bits for the PDSCHs #1, #2, and #3 are mapped to the positions corresponding to the candidate PDSCH reception occasion indices "1", "2", and "3" in the HARQ-ACK codebook for URLLC.

The ARI in the DCI for scheduling PDSCHs #1, 2, and 3 for URLLC is 1, 2, and 3. As described above, when a plurality of ARIs for the same service are detected in the same HARQ-ACK window, the UE may determine PUCCH resource #3 to be used for transmission of the HARQ-ACK codebook for URLLC, based on the ARI that is most recently detected (for example, in FIG. 17, "ARI=3" in the DCI for scheduling PDSCH #2).

As described above, in the second method, the set of candidate PDSCH reception occasions for each service are given by the same granularity of the HARQ-ACK timing value $K_1$ between the plurality of services and a different PDSCH time domain RA table or a different row in a common PDSCH time domain RA table. Therefore, the size of the HARQ-ACK codebook for at least one service can be reduced based on the set of candidate PDSCH reception occasions $M_{A,\,c}$ for each service.

<<Third Method>>

In the third method, different granularity of the HARQ-ACK timing value $K_1$ and the same PDSCH time domain RA table are used between the plurality of services (for example, the eMBB service and the URLLC service). Note that, in the third method, difference from at least one of the first and second methods will be mainly described.

In the third method, although the same PDSCH time domain RA table is used, different sets of candidate PDSCH reception occasions are used between the plurality of services because different granularity of the HARQ-ACK timing value $K_1$ is used as the basis.

Figure 18:
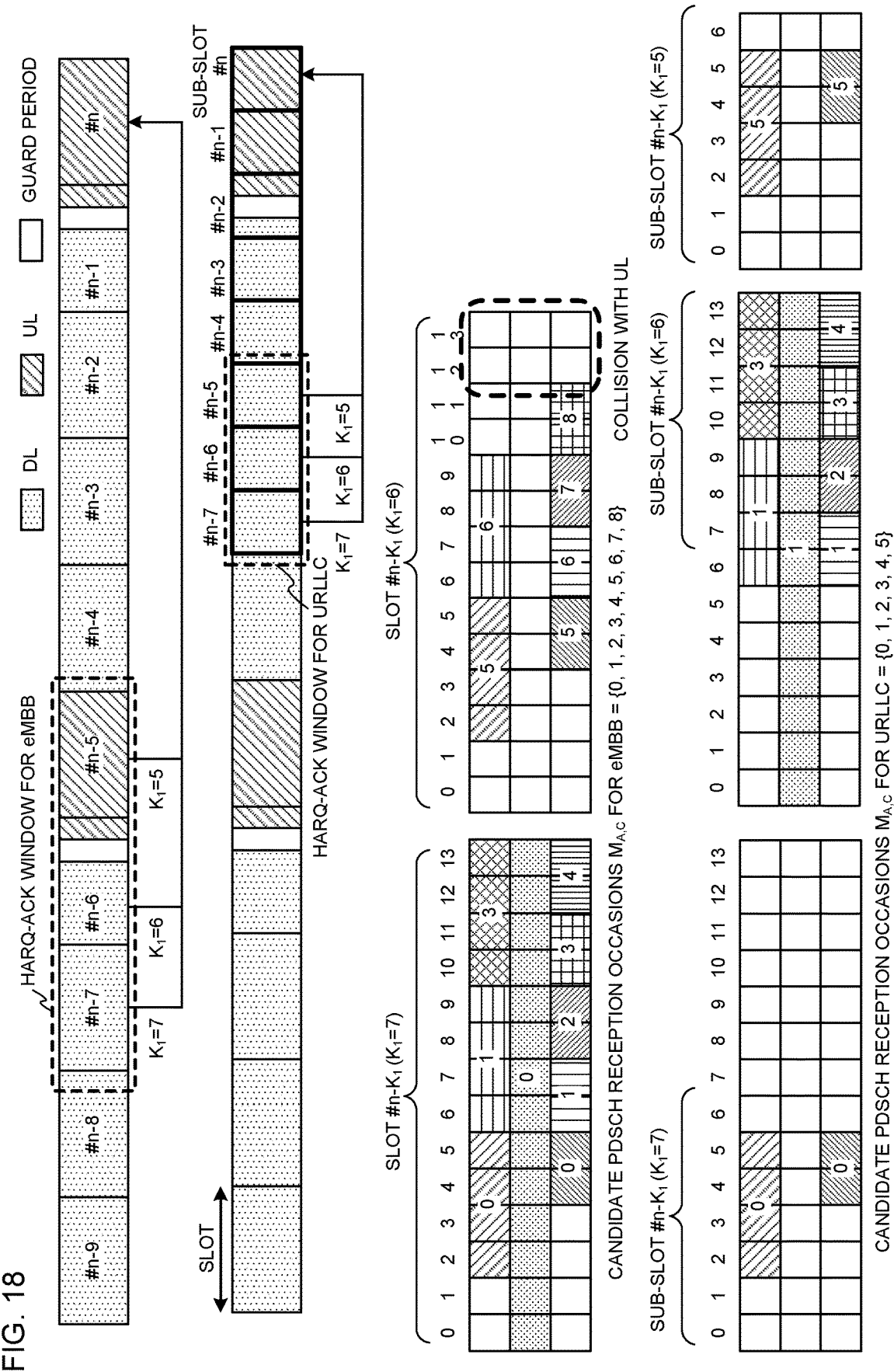
FIG. 18 is a diagram to show an example of the set of candidate PDSCH reception occasions for each service according to the third method of the second aspect.

FIG. 18 is a diagram to show an example of the set of candidate PDSCH reception occasions for each service according to the third method of the second aspect. FIG. 18 shows an example in which the granularity of the HARQ-ACK timing value $K_1$ for the eMBB service is at the slot level, and the granularity of the HARQ-ACK timing value $K_1$ for the URLLC service is at the sub-slot level. However, the present invention is not limited to this example.

For example, the granularity of the HARQ-ACK timing value $K_1$ for the eMBB service may be at the sub-slot level, and the granularity of the HARQ-ACK timing value $K_1$ for the URLLC service may be at the sub-slot level. The granularities of the HARQ-ACK timing value $K_1$ for the eMBB service and the URLLC service may be sub-slots of different numbers of symbols (for example, the sub-slot of seven symbols and the sub-slot of two symbols), for example.

FIG. 18 shows the candidate PDSCH reception occasions for each service that are determined based on the PDSCH time domain RA table shown in FIG. 1B and a format of a certain time unit (for example, the slot).

Specifically, the UE may determine the HARQ-ACK window (set C ($K_1$) of HARQ-ACK timing values $K_1$) for each service. The UE may determine the set of candidate PDSCH reception occasions for each service, based on the PDSCH time domain RA table of FIG. 1B and the format of the certain time unit (for example, the slot or the sub-slot), for each service and for each HARQ-ACK timing value $K_1$. Indices for each service may be assigned to each of the candidate PDSCH reception occasions in the HARQ-ACK window for each service.

For example, in FIG. 18, the candidate PDSCH reception occasions assigned the indices "0" to "5" are included in the set of available candidate PDSCH reception occasions $M_{A, c}$ in the HARQ-ACK window for URLLC. On the other hand, the candidate PDSCH reception occasions assigned the indices "0" to "8" are included in the set of available candidate PDSCH reception occasions $M_{A, c}$ in the HARQ-ACK window for eMBB.

[eMBB Service]

Figure 19:
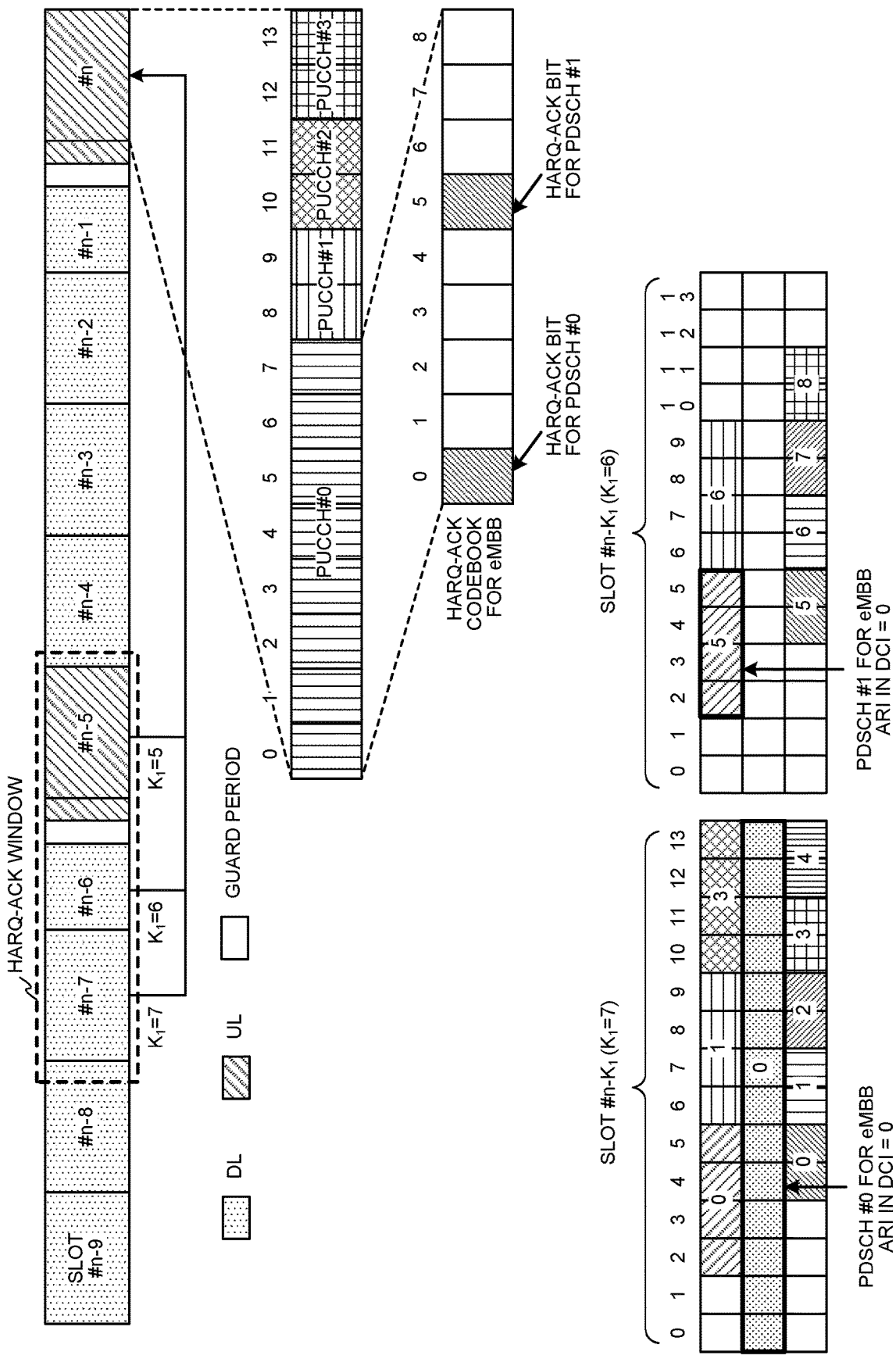
FIG. 19 is a diagram to show an example of the semi-static HARQ-ACK codebook determination operation for eMBB according to the third method of the second aspect.

FIG. 19 is a diagram to show an example of the semi-static HARQ-ACK codebook determination operation for eMBB according to the third method of the second aspect. In FIG. 19, the HARQ-ACK timing value $K_1$ at the slot level is used for the eMBB service, and thus the UE may determine the set of candidate PDSCH reception occasions $M_{A, c}$ for the eMBB service in slot #n-$K_1$ for each HARQ-ACK timing value $K_1$, according to the semi-static HARQ codebook determination operation at the slot level (see, for example, FIGS. 1A to 1C and 2 to 4).

As described with reference to FIG. 18, the candidate PDSCH reception occasions $M_{A, c}$ assigned the indices "0" to "8" are available for the eMBB service in the HARQ-ACK window (corresponding to the set C ($K_1$) of HARQ-ACK timing values $K_1=\{7, 6, 5\}$). For this reason, in a case in which retransmission control in the unit of the CBG with the number of layers being 1 is not configured for the UE, the HARQ-ACK codebook for eMBB may include 9 bits.

For example, in FIG. 19, PDSCHs #0 and #1 for eMBB are allocated to candidate PDSCH reception occasion #0 including symbols #0 to #13 in slot #n-$K_1$ ($K_1=7$) and candidate PDSCH reception occasion #5 including symbols #2 to #5 in slot #n-$K_1$ ($K_1=6$). The HARQ-ACK bits for the PDSCHs #0 and #1 are mapped to the positions corresponding to the candidate PDSCH reception occasion indices "0" and "5" in the HARQ-ACK codebook for eMBB.

The ARI in the most recent DCI (DCI for scheduling PDSCH #1) in the HARQ-ACK window for the eMBB service is 0. For this reason, the UE may determine PUCCH resource #0 to be used for transmission of the HARQ-ACK codebook for eMBB, based on the ARI.

Note that, although not shown in the figures, when the HARQ-ACK timing values $K_1$ at the sub-slot level are used for the eMBB service, the UE may determine the set of candidate PDSCH reception occasions $M_{A, c}$ for the eMBB service, according to the semi-static HARQ codebook determination operation at the sub-slot level (see, for example, FIGS. 5B, 6A to 6C, and 7 to 9).

[URLLC Service]

Figure 20:
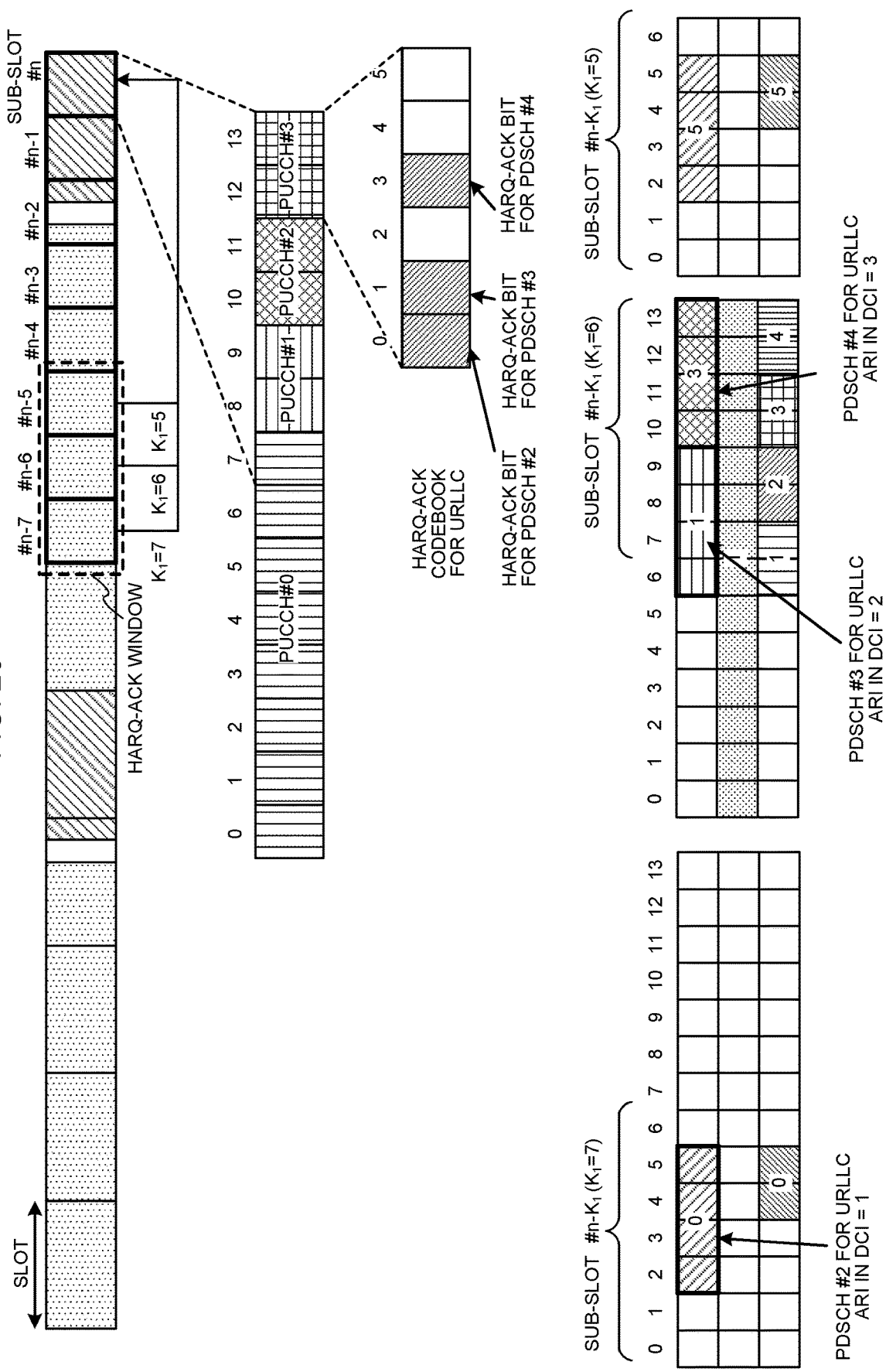
FIG. 20 is a diagram to show an example of the semi-static HARQ-ACK codebook determination operation for URLLC according to the third method of the second aspect.

FIG. 20 is a diagram to show an example of the semi-static HARQ-ACK codebook determination operation for URLLC according to the third method of the second aspect. In FIG. 20, the HARQ-ACK timing value $K_1$ at the sub-slot level is used for the URLLC service, and thus the UE may determine the set of candidate PDSCH reception occasions $M_{A, c}$ for the URLLC service in slot #n-$K_1$ for each HARQ-ACK timing value $K_1$, according to the semi-static HARQ codebook determination operation at the sub-slot level (see, for example, FIGS. 5B, 6A to 6C, and 7 to 9).

As described with reference to FIG. 18, in the HARQ-ACK window (corresponding to the set C ($K_1$) of HARQ-ACK timing values $K_1=\{7, 6, 5\}$), the candidate PDSCH reception occasions $M_{A, c}$ assigned the indices "0" to "5" are available for the URLLC service. For this reason, in a case in which retransmission control in the unit of the CBG with the number of layers being 1 is not configured for the UE, the HARQ-ACK codebook for URLLC may include 4 bits.

For example, in FIG. 20, PDSCHs #2, #3, and #4 for URLLC are allocated to candidate PDSCH reception occasion #0 including symbols #2 to #5 in sub-slot #n-$K_1$ ($K_1=7$) and candidate PDSCH reception occasions #1 and #3 at least a part of which belongs to sub-slot #n-$K_1$ ($K_1=6$). The HARQ-ACK bits for the PDSCHs #2, #3, and #4 are mapped to the positions corresponding to the candidate PDSCH reception occasion indices "0", "1", and "3" in the HARQ-ACK codebook for eMBB.

The ARI in the most recent DCI (DCI for scheduling PDSCH #4) in the HARQ-ACK window for the URLLC service is 3. For this reason, the UE may determine PUCCH resource #3 to be used for transmission of the HARQ-ACK codebook for URLLC, based on the ARI.

Note that, although not shown in the figures, when the HARQ-ACK timing values $K_1$ at the slot level are used for the URLLC service, the UE may determine the set of candidate PDSCH reception occasions $M_{A, c}$ for the URLLC service, according to the semi-static HARQ codebook determination operation at the slot level (see, for example, FIGS. 1A to 1C and 2 to 4).

As described above, in the third method, different granularity of the HARQ-ACK timing value $K_1$ is used between the plurality of services. Therefore, the set of candidate PDSCH reception occasions may be determined for each service, based on the same PDSCH time domain RA table.

<<Fourth Method>>

In the fourth method, different granularity of the HARQ-ACK timing value $K_1$ and a different PDSCH time domain RA table are used between the plurality of services (for example, the eMBB service and the URLLC service). Note that, in the fourth method, difference from at least one of the first to third methods will be mainly described.

In the fourth method, as shown in the example of FIG. 13A or 13B, rows or tables for the PDSCH time domain RA different for each service are given. The UE can use different sets of candidate PDSCH reception occasions between the plurality of services, based on the rows or tables and the different granularity of the HARQ-ACK timing value $K_1$ for each service.

For example, when the granularity of the HARQ-ACK timing value $K_1$ for the eMBB service is at the slot level and the granularity of the HARQ-ACK timing value $K_1$ for the URLLC service is at the sub-slot level, the UE may determine the candidate PDSCH reception occasions $M_{A, c}$ assigned the indices "0" to "2" of FIG. 14 for eMBB. On the other hand, the UE may determine the candidate PDSCH reception occasions $M_{A, c}$ assigned the indices "0" to "3" of FIG. 16 for URLLC. Note that the details of the determination operation are as described with reference to FIGS. 14 and 16.

For example, when the granularity of the HARQ-ACK timing value $K_1$ for the eMBB service is at the sub-slot level and the granularity of the HARQ-ACK timing value $K_1$ for the URLLC service is at the slot level, the UE may determine the candidate PDSCH reception occasions $M_{A, c}$ assigned the index "0" of FIG. 16 for eMBB. On the other hand, the UE may determine the candidate PDSCH reception occasions $M_{A, c}$ assigned the indices "0" to "8" of FIG. 14 for URLLC. Note that the details of the determination operation are as described with reference to FIGS. 14 and 16.

As described above, in the fourth method, the set of candidate PDSCH reception occasions for each service is used by using different rows or tables for the PDSCH time domain RA for each service. Therefore, the size of the HARQ-ACK codebook for at least one service can be reduced.

<Feedback of Semi-Static HARQ-ACK Codebook>

In the second aspect, the semi-static HARQ-ACK codebook can be determined for each service by using any one of the first to fourth methods described above. The first to fourth methods have described an example in which the UE transmits the semi-static HARQ-ACK codebook for each service by using the PUCCH for each service in the same time unit (for example, the slot or the sub-slot). However, the present invention is not limited to this example.

<<Option 1>>

In a certain time unit (for example, the slot or the sub-slot), the UE may transmit the HARQ-ACK bits corresponding to different services in a single semi-static HARQ-ACK codebook. In this case, the UE may first determine the semi-static HARQ-ACK codebook for each service (see the first to fourth methods), and then generate the single semi-static HARQ-ACK codebook, based on the positions of the HARQ-ACK bits for each service.

For example, as has been described in the first to fourth methods described above, the HARQ-ACK codebook for eMBB may include the HARQ-ACK bits for the PDSCH for eMBB, and may not include the HARQ-ACK bits for the PDSCH for URLLC (for example, FIGS. 11 and 12 and other figures). In this case, the first to fourth methods described above may be applied.

Alternatively, if there is sufficient PDSCH processing time for URLLC, the HARQ-ACK codebook for eMBB may include the HARQ-ACK bits that are based on decoding results of the PDSCH for URLLC at the positions corresponding to the candidate PDSCH reception occasion indices used to receive the PDSCH for URLLC. Note that, if there is not sufficient PDSCH processing time for URLLC, NACK bits may be included at the positions corresponding to the candidate PDSCH reception occasion indices. In this case, the first method described above may be applied.

Alternatively, the HARQ-ACK codebook for eMBB may include the HARQ-ACK bits for the PDSCH for URLLC (with ACK bits or NACK bits being used as a virtual CRC) at the positions corresponding to the candidate PDSCH reception occasion indices used to receive the PDSCH for URLLC, regardless of whether or not the PDSCH processing time for URLLC is satisfied. In this case, the first method described above may be applied.

As has been described in the first to fourth methods described above, the HARQ-ACK codebook for URLLC may include the HARQ-ACK bits for the PDSCH for URLLC, and may not include the HARQ-ACK bits for the PDSCH for eMBB (for example, FIGS. 11 and 12 and other figures). In this case, the first to fourth methods described above may be applied.

Alternatively, the HARQ-ACK codebook for URLLC may include both of the HARQ-ACK bits for the PDSCH for URLLC and the HARQ-ACK bits for the PDSCH for eMBB. The HARQ-ACK bits for eMBB may be the HARQ-ACK bits that are based on decoding results, may be the NACK bits, or may be the virtual CRC. In this case, the first method described above may be applied.

Figure 21:
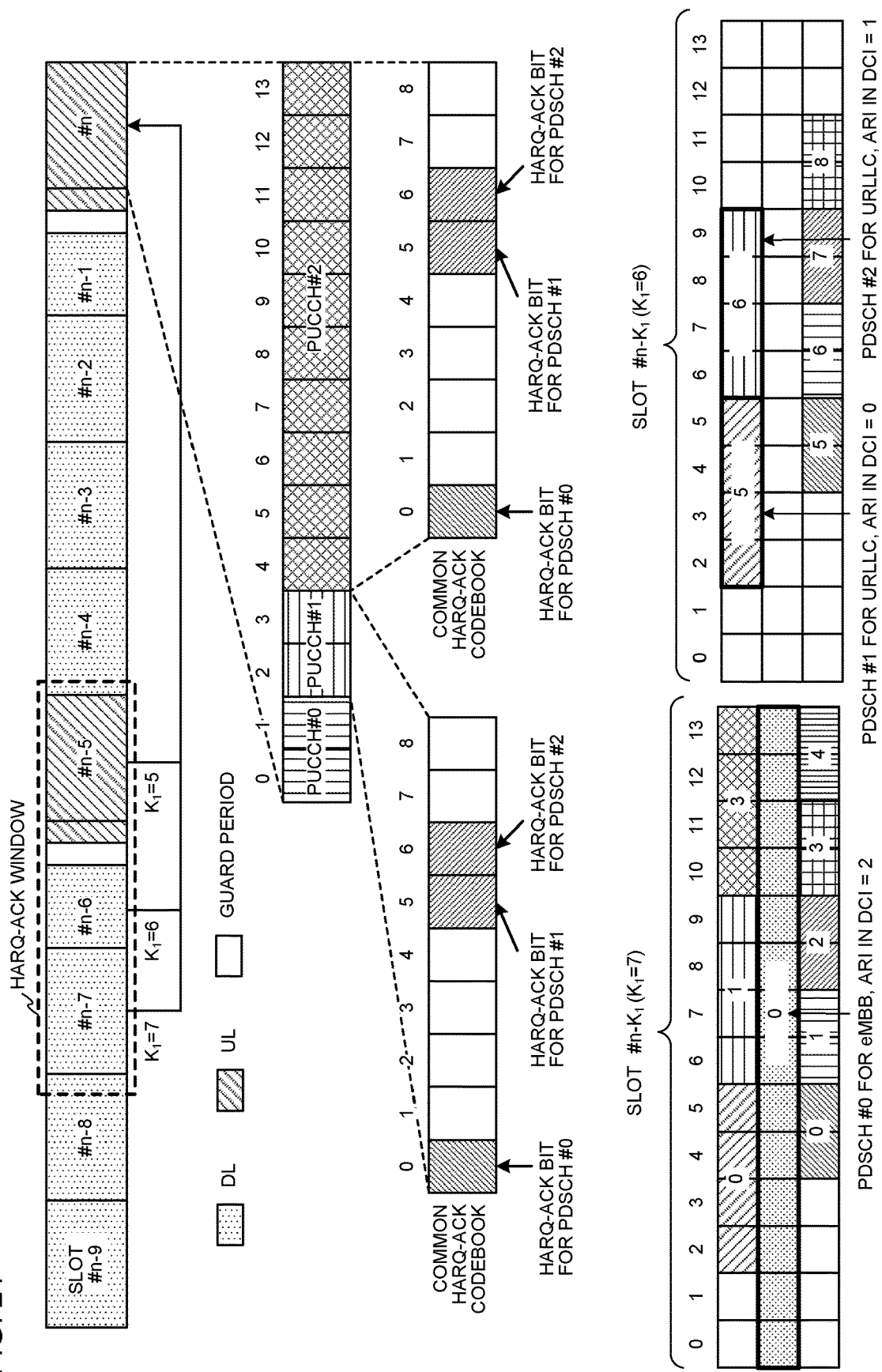
FIG. 21 is a diagram to show an example of a common HARQ-ACK codebook according to option 1 of the second aspect.

FIG. 21 is a diagram to show an example of the semi-static HARQ-ACK codebook common to a plurality of services (common HARQ-ACK codebook) according to option 1 of the second aspect. FIG. 21 shows an example in which the HARQ-ACK timing value $K_1$ of the same granularity (for example, the slot level) is used between the plurality of services, in a manner similar to FIG. 11.

In FIG. 11, the HARQ-ACK codebook for eMBB including the HARQ-ACK bits for the PDSCH for eMBB and the HARQ-ACK codebook for eMBB including the HARQ-ACK bits for the PDSCH for URLLC are respectively fed back in different PUCCCH resources #1 and #2.

On the other hand, in FIG. 21, the common HARQ-ACK codebook that is common to eMBB and URLLC and that includes the HARQ-ACK bits for the PDSCH for eMBB and the HARQ-ACK bits for the PDSCH for URLLC may be fed back. The common HARQ-ACK codebook may be, as shown in FIG. 21, transmitted on a plurality of PUCCH resources in slot #n, or may be transmitted on a single PUCCH resource.

Figure 22:
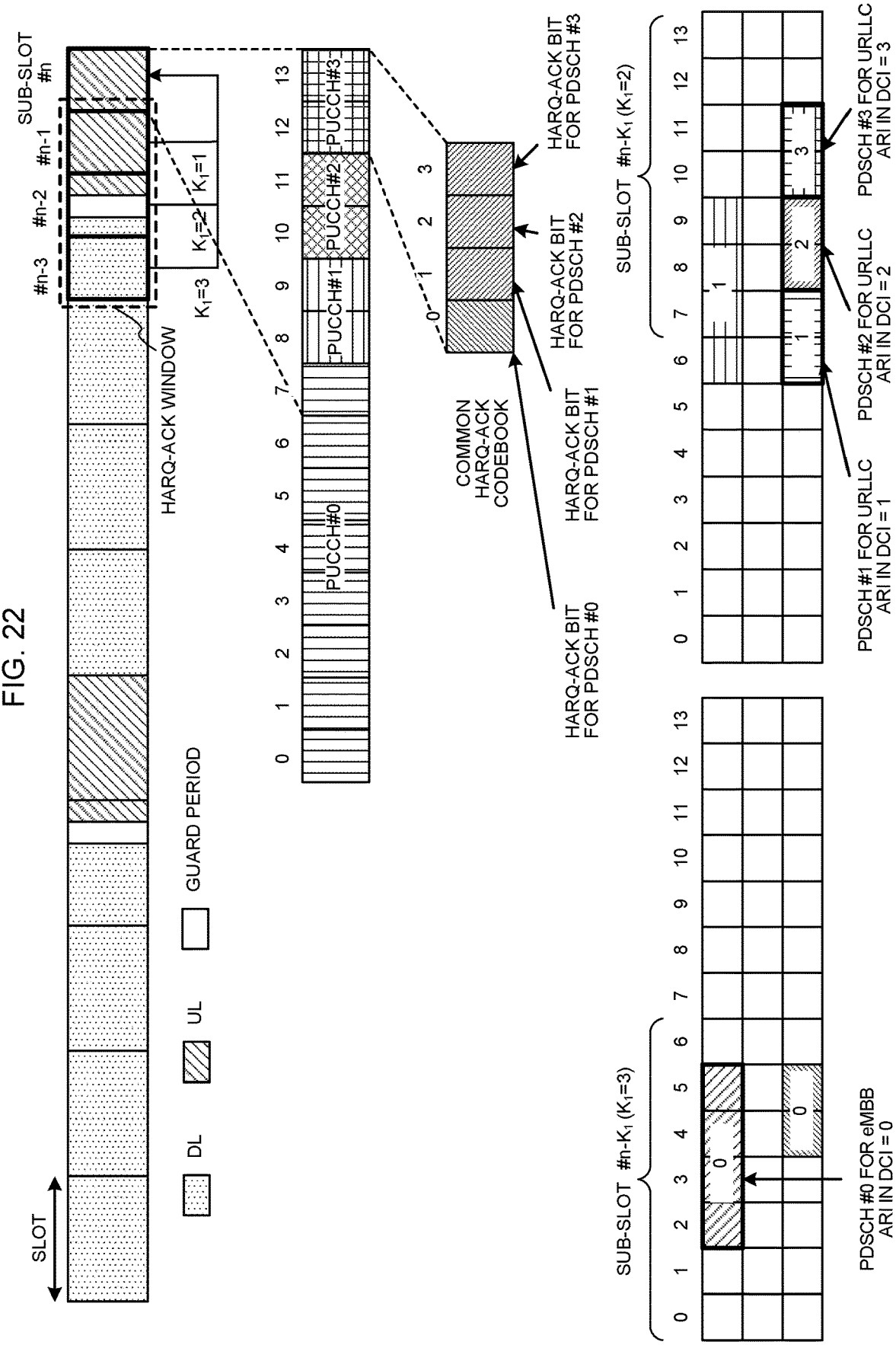
FIG. 22 is a diagram to show another example of the common HARQ-ACK codebook according to option 1 of the second aspect.

FIG. 22 is a diagram to show another example of the semi-static HARQ-ACK codebook common to a plurality of services (common HARQ-ACK codebook) according to option 1 of the second aspect. FIG. 22 is the same as FIG. 21 except that FIG. 22 shows an example in which the HARQ-ACK timing value $K_1$ of the same granularity (for example, at the sub-slot level) is used between the plurality of services, in a similar to FIG. 12.

<<Option 2>>

In a certain time unit (for example, the slot or the sub-slot), the UE may transmit the semi-static HARQ-ACK codebook of a specific service, without the UE transmitting the semi-static HARQ-ACK codebook of the plurality of services. In this case, the UE may drop the semi-static HARQ-ACK codebook of the rest of the service(s).

For example, when the UE receives at least one of the PDCCH and the PDSCH for URLLC, the UE may transmit the HARQ-ACK codebook for URLLC including the HARQ-ACK bits at the positions corresponding to the indices of the candidate PDSCH reception occasions for the URLLC.

In a case other than the above, the UE may transmit the HARQ-ACK codebook for eMBB including the HARQ-ACK bits at the positions corresponding to the indices of the candidate PDSCH reception occasions for the eMBB.

<<Determination of Feedback Method>>

The UE may determine which semi-static HARQ-ACK codebook (for example, at least one of the HARQ-ACK codebook for eMBB and the HARQ codebook for URLLC, or the common HARQ-ACK codebook) is to be fed back in a certain time unit by using at least one of the higher layer signaling and the DCI.

Alternatively, the UE may derive which semi-static HARQ-ACK codebook is to be fed back in a certain time unit, based on another parameter (for example, capability information of the UE). For example, the UE may determine the semi-static HARQ-ACK codebook to be fed back in a certain time unit, based on whether or not the UE can generate the HARQ-ACK codebook for each service.

In the second aspect, when the UE supports a plurality of services having different requirements, at least one of determination and feedback of the semi-static HARQ-ACK codebook based on the HARQ-ACK timing value at certain time unit (for example, the slot or the sub-slot) level can be appropriately controlled.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 23:
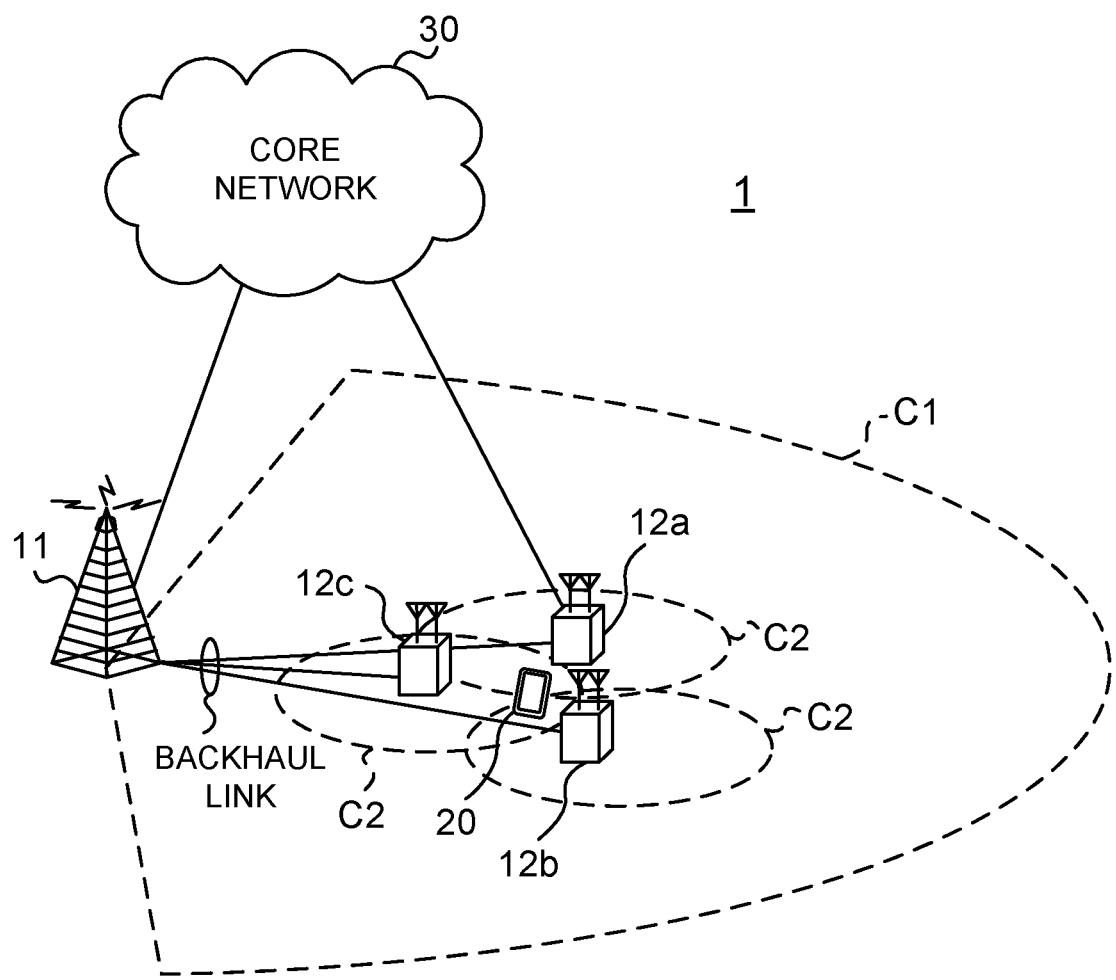
FIG. 23 is a diagram to show an example of a schematic structure of a radio communication system according to one embodiment.

FIG. 23 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5 GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 24:
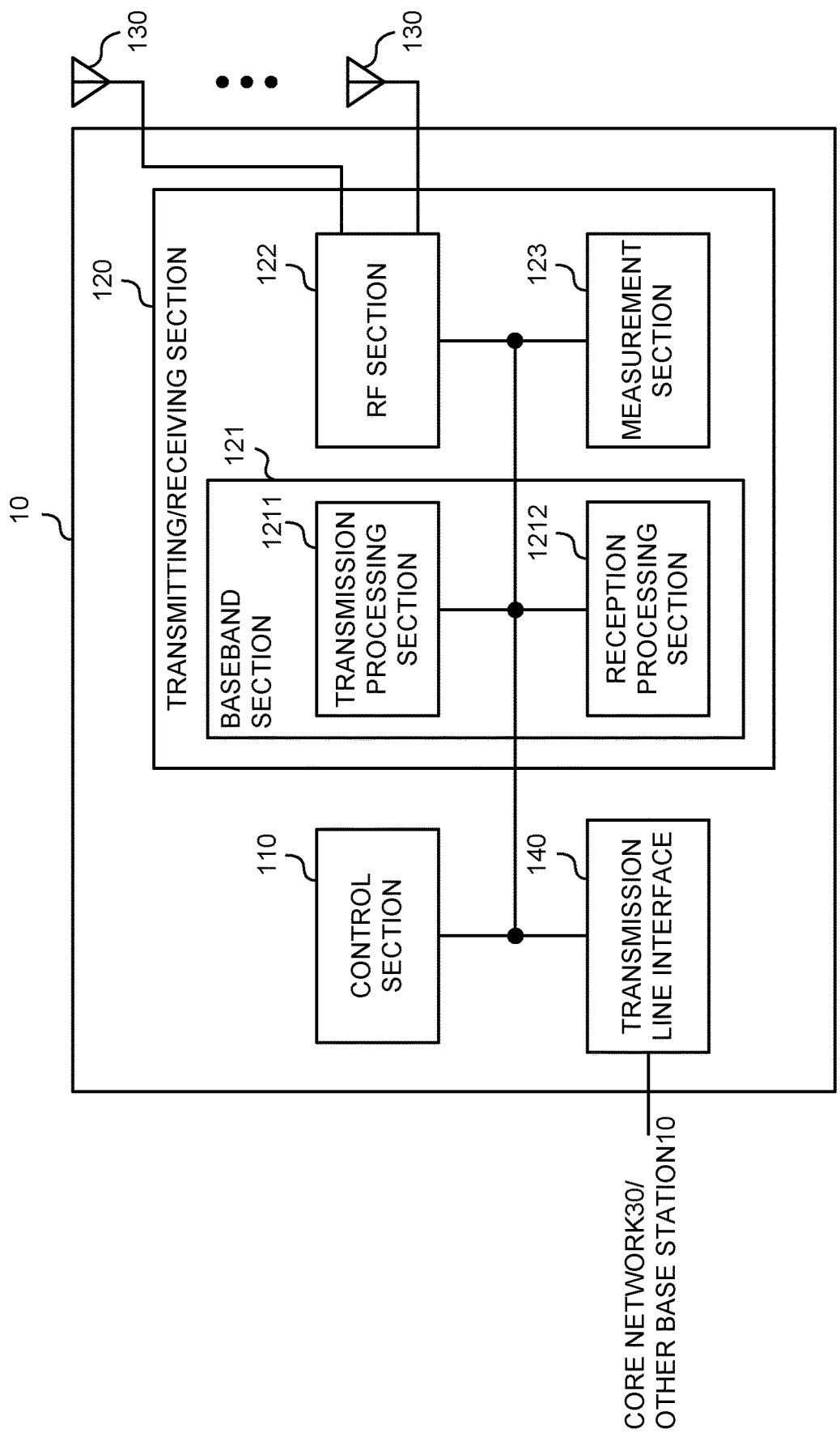
FIG. 24 is a diagram to show an example of a structure of a base station according to one embodiment.

FIG. 24 is a diagram to show an example of a structure of the base station according to one embodiment. The base station 10 includes a control section 110, a transmitting/receiving section 120, transmitting/receiving antennas 130 and a communication path interface 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may receive the codebook (semi-static HARQ-ACK codebook). The transmitting/receiving section 120 may receive the codebook by using the PUCCH or the PUSCH.

Note that the transmitting/receiving section 120 may transmit information indicating granularity (time unit) of the HARQ-ACK timing value. The information may be included in system information or an RRC parameter. The transmitting/receiving section 120 may transmit at least one of the higher layer signaling and the DCI indicating which semi-static HARQ-ACK codebook (for example, at least one of the HARQ-ACK codebook for eMBB and the HARQ codebook for URLLC, or the common HARQ-ACK codebook) is to be fed back in a certain time unit.

Note that the control section 110 may control transmission of the PDSCH, based on the received codebook.

(User Terminal)

Figure 25:
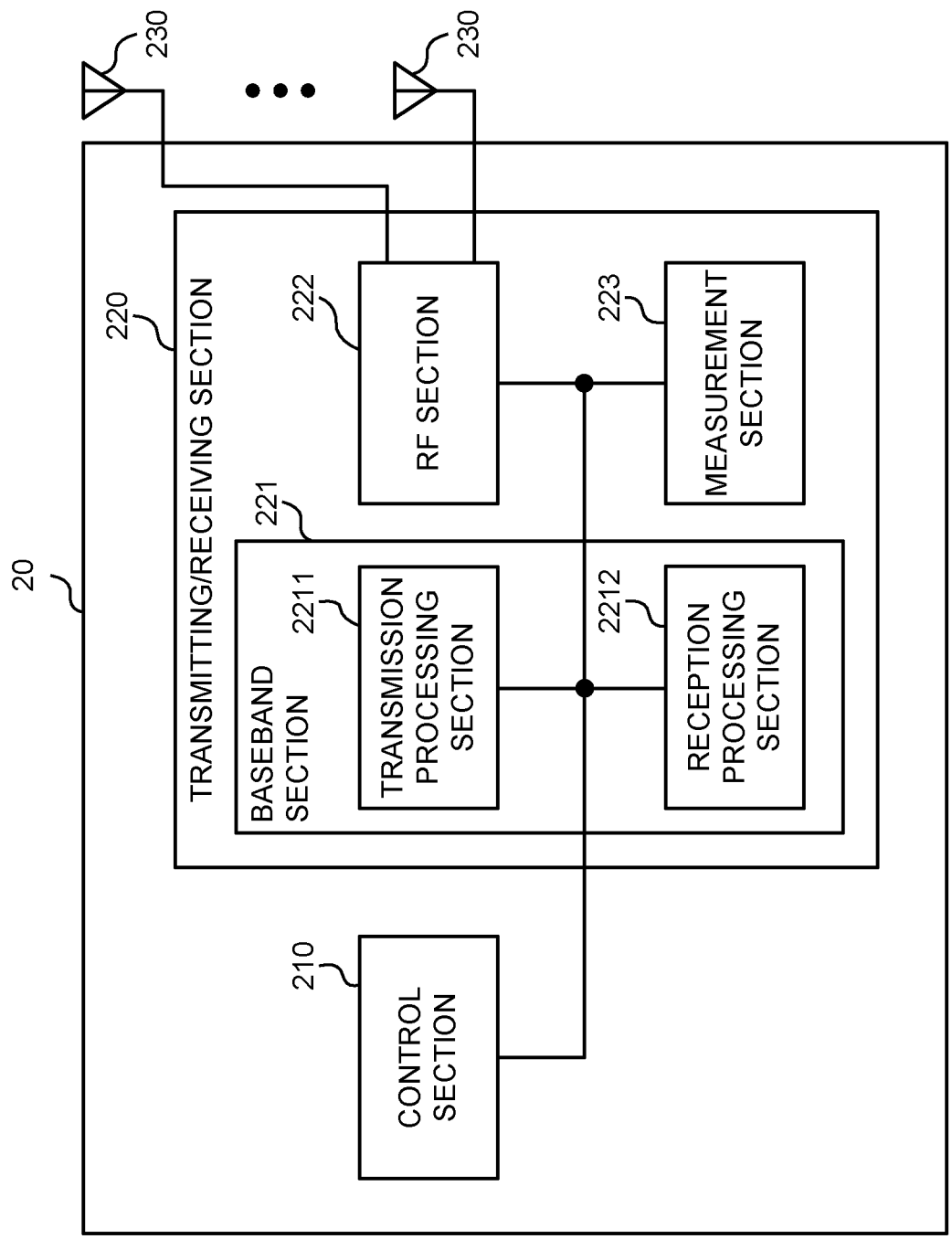
FIG. 25 is a diagram to show an example of a structure of a user terminal according to one embodiment.

FIG. 25 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the transmitting/receiving section 220 may transmit the codebook (semi-static HARQ-ACK codebook). The transmitting/receiving section 220 may transmit the codebook by using the PUCCH or the PUSCH.

Note that the transmitting/receiving section 220 may receive information indicating granularity (time unit) of the HARQ-ACK timing value. The information may be included in system information or an RRC parameter. The transmitting/receiving section 220 may receive at least one of the higher layer signaling and the DCI indicating which semi-static HARQ-ACK codebook (for example, at least one of the HARQ-ACK codebook for eMBB and the HARQ codebook for URLLC, or the common HARQ-ACK codebook) is to be fed back in a certain time unit.

The control section 210 may determine the set of one or more candidate occasions (candidate PDSCH reception occasions) for reception of a downlink shared channel available in the time unit, based on the HARQ-ACK timing value using the time unit shorter than the slot and the format of the time unit (first aspect).

The control section 210 may control determination of the codebook based on the set of candidate occasions.

The control section 210 may determine the set of candidate occasions, based on the time domain resource allocation for each time unit in the slot.

The control section 210 may determine which time unit in the slot each of the candidate occasions that is determined based on each time domain resource allocation in the slot belongs, based on the position of the start symbol or the last symbol of each of the candidate occasions (first aspect).

The time domain resource allocation for each time unit may be defined in a table including a row in which at least one of a slot offset value, an index of the start symbol, a time length, and a mapping type and a row index are associated with each other.

The control section 210 may determine the set of one or more candidate occasions for reception of a downlink shared channel available in the time unit, based on the HARQ-ACK timing value using the same or different time unit between a plurality of services and the format of the time unit (second aspect).

The control section 210 may determine the set of candidate occasions, based on the same or different time domain resource allocation between the plurality of services (second aspect).

The control section 210 may determine the set of candidate occasions so as to be specific to or common to the plurality of services (second aspect).

The control section 210 may determine the codebook so as to be specific to or common to the plurality of services, based on the set of candidate occasions (second aspect).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using this plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 26:
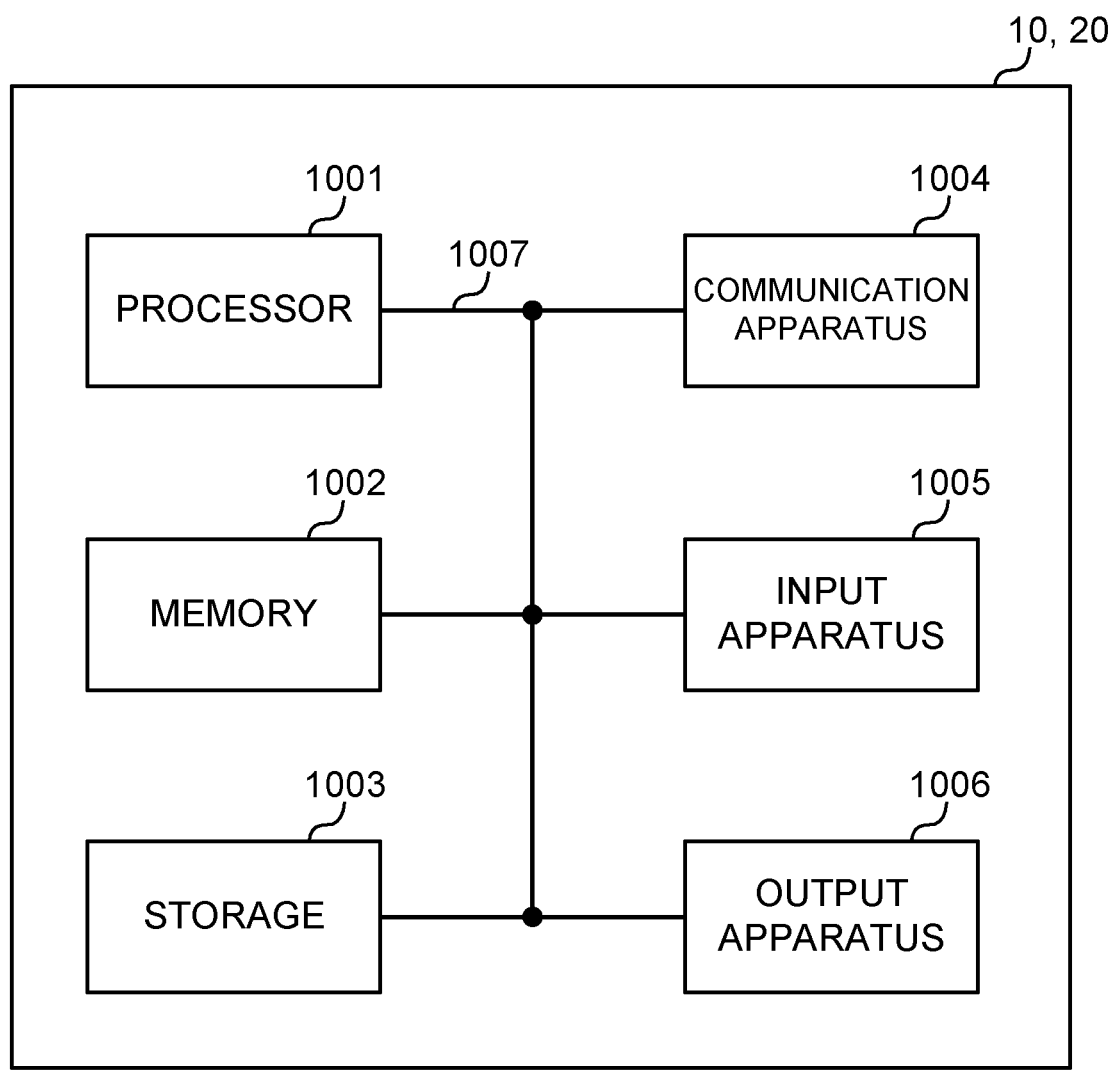
FIG. 26 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 26 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding wait)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a transmitter that transmits capability information indicating support of granularity of a Hybrid Automatic Repeat reQuest-ACKnowledgement (HARQ-ACK) timing value of a sub-slot unit shorter than a slot;
a receiver that receives a Radio Resource Control (RRC) parameter indicating granularity of the HARQ-ACK timing value of the sub-slot unit shorter than the slot; and
a processor that, when a number of symbols in the sub-slot, which indicates the granularity of the HARQ-ACK timing value, is set to 2 symbols or 7 symbols by the RRC parameter, controls to transmit a plurality of uplink control channels (PUCCHs) for a HARQ-ACK in a slot, each of the plurality of PUCCHs having the number of symbols,
wherein the processor determines, from among the plurality of PUCCHs, based on a certain field value in Downlink Control Information (DCI), a PUCCH for transmitting a HARQ-ACK bit corresponding to a Physical Downlink Shared Channel (PDSCH) scheduled by the DCI.

2. The terminal according to claim 1, wherein the granularity is the same between a plurality of services.

3. A radio communication method for a terminal, comprising:
transmitting capability information indicating support of granularity of a Hybrid Automatic Repeat reQuest-ACKnowledgement (HARQ-ACK) timing value of a sub-slot unit shorter than a slot;
receiving a Radio Resource Control (RRC) parameter indicating granularity of the HARQ-ACK timing value of the sub-slot unit shorter than the slot; and
controlling, when a number of symbols in the sub-slot, which indicates the granularity of the HARQ-ACK timing value, is set to 2 symbols or 7 symbols by the RRC parameter, to transmit a plurality of uplink control channels (PUCCHs) for a HARQ-ACK in a slot, each of the plurality of PUCCHs having the number of symbols,
wherein the controlling determines, from among the plurality of PUCCHs, based on a certain field value in Downlink Control Information (DCI), a PUCCH for transmitting a HARQ-ACK bit corresponding to a Physical Downlink Shared Channel (PDSCH) scheduled by the DCI.

4. A base station comprising:
a receiver that receives capability information indicating support of granularity of a Hybrid Automatic Repeat reQuest-ACKnowledgement (HARQ-ACK) timing value of a sub-slot unit shorter than a slot;
a transmitter that transmits a Radio Resource Control (RRC) parameter indicating granularity of the HARQ-ACK timing value of the sub-slot unit shorter than the slot; and
a processor that, when a number of symbols in the sub-slot, which indicates the granularity of the HARQ-ACK timing value, is set to 2 symbols or 7 symbols by the RRC parameter, controls to receive a plurality of uplink control channels (PUCCHs) for a HARQ-ACK in a slot, each of the plurality of PUCCHs having the number of symbols,
wherein the processor determines, from among the plurality of PUCCHs, based on a certain field value in Downlink Control Information (DCI), a PUCCH for receiving a HARQ-ACK bit corresponding to a Physical Downlink Shared Channel (PDSCH) scheduled by the DCI.

5. A system comprising a terminal and a base station, wherein
the terminal comprises:
a transmitter that transmits capability information indicating support of granularity of a Hybrid Automatic Repeat reQuest-ACKnowledgement (HARQ-ACK) timing value of a sub-slot unit shorter than a slot;
a receiver that receives a Radio Resource Control (RRC) parameter indicating granularity of the HARQ-ACK timing value of the sub-slot unit shorter than the slot; and
a processor that, when a number of symbols in the sub-slot, which indicates the granularity of the HARQ-ACK timing value, is set to 2 symbols or 7 symbols by the RRC parameter, controls to transmit a plurality of uplink control channels (PUCCHs) for a HARQ-ACK in a slot, each of the plurality of PUCCHs having the number of symbols;
wherein the processor determines, from among the plurality of PUCCHs, based on a certain field value in Downlink Control Information (DCI), a PUCCH for transmitting a HARQ-ACK bit corresponding to a Physical Downlink Shared Channel (PDSCH) scheduled by the DCI; and
the base station comprises:
a transmitter that transmits the RRC parameter.

* * * * *